US007986839B2

(12) United States Patent
Hirohata

(10) Patent No.: US 7,986,839 B2
(45) Date of Patent: Jul. 26, 2011

(54) IMAGE PROCESSING METHOD, IMAGE PROCESSING APPARATUS, IMAGE FORMING APPARATUS, AND STORAGE MEDIUM

(75) Inventor: Hitoshi Hirohata, Hashimoto (JP)

(73) Assignee: Sharp Kabushiki Kaisha, Osaka (JP)

(*) Notice: Subject to any disclaimer, the term of this patent is extended or adjusted under 35 U.S.C. 154(b) by 345 days.

(21) Appl. No.: 12/392,814

(22) Filed: Feb. 25, 2009

(65) Prior Publication Data
US 2009/0214116 A1 Aug. 27, 2009

(30) Foreign Application Priority Data

Feb. 26, 2008 (JP) ................................ 2008-045116

(51) Int. Cl.
*G06K 9/18* (2006.01)
*H04N 1/40* (2006.01)
*G01C 22/00* (2006.01)
(52) U.S. Cl. .......................... 382/182; 358/448; 701/28
(58) Field of Classification Search .................. 382/100, 382/182, 190, 218, 286, 305; 358/1.9, 3.23, 358/3.28, 448, 462, 530; 701/28; 707/999.005, 707/999.006
See application file for complete search history.

(56) References Cited

U.S. PATENT DOCUMENTS

| 5,465,353 | A | * | 11/1995 | Hull et al. .............................. 1/1 |
| 5,799,115 | A | * | 8/1998 | Asano et al. .................. 382/305 |
| 7,002,709 | B1 | * | 2/2006 | Terada et al. ................ 358/3.28 |
| 7,072,486 | B1 | * | 7/2006 | Akamatsu et al. ........... 382/100 |
| 2004/0234169 | A1 | | 11/2004 | Tojo |
| 2006/0056660 | A1 | | 3/2006 | Tojo |
| 2008/0177764 | A1 | | 7/2008 | Kise et al. |

FOREIGN PATENT DOCUMENTS

| JP | 5-110815 A | 4/1993 |
| JP | 06-208368 | 7/1994 |
| JP | 2000-76458 A | 3/2000 |
| JP | 2000-175031 A | 6/2000 |
| JP | 2000-333004 A | 11/2000 |
| JP | 2001-57631 A | 2/2001 |
| JP | 2001197303 | 7/2001 |
| JP | 2004-265237 | 9/2004 |
| JP | 2005-4724 A | 1/2005 |
| JP | 2006-85298 A | 3/2006 |
| JP | 2006-333248 A | 12/2006 |

OTHER PUBLICATIONS

Nakai et al., Document Image Retrieval and Removal of Perspective Distortion Based on Voting for Cross-Ratios, Graduate School of Engineering, Osaka Prefecture University, pp. 538-545, 2005.

* cited by examiner

*Primary Examiner* — Abolfazl Tabatabai
(74) *Attorney, Agent, or Firm* — Birch, Stewart, Kolasch & Birch, LLP

(57) ABSTRACT

In the image processing apparatus of the present invention, when a document is read, a document matching process section determines whether the document is similar to a reference document or not. When the document is similar to the reference document, the document matching process section further determines whether the document has been zoomed (size of the document has been changed). When the document has been zoomed, an editing process section restores the size of the document to the size of the reference document. This provides an image processing apparatus capable of restoring the changed size of a document in a predetermined format such as a form document and an application document to its original size.

10 Claims, 17 Drawing Sheets

FIG. 3 (a)

APPLICATION FOR BUSINESS/PRIVATE OUTING

___/___/___
(MONTH) (DATE) (YEAR)

SIGNATURE: _____

A COOPERATION

PLEASE ACCEPT MY APPLICATION FOR
BUSINESS/PRIVATE OUTING DURING THE
FOLLOWING PERIOD.

(1) PERIOD FOR BUSINESS/PRIVATE OUTING
___/___/___
(MONTH) (DATE) (YEAR)
AM/PM ___:___ ~ AM/PM ___:___

(2) REASON

| SIGNATURE OF PERSON IN CHARGE | |
|---|---|

FIG. 3 (b)

APPLICATION FOR (BUSINESS)/PRIVATE OUTING

_1_/_7_/_2007_
(MONTH) (DATE) (YEAR)

SIGNATURE: Alan Smith

A COOPERATION

PLEASE ACCEPT MY APPLICATION FOR
BUSINESS/PRIVATE OUTING DURING THE
FOLLOWING PERIOD.

(1) PERIOD FOR BUSINESS/PRIVATE OUTING
_1_/_9_/_2007_
(MONTH) (DATE) (YEAR)
(AM)/PM _10:00_ ~ AM/(PM) _3:00_

(2) REASON
XXXXXXXX

| SIGNATURE OF PERSON IN CHARGE | |
|---|---|

FIG. 5
| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |
FIG. 6
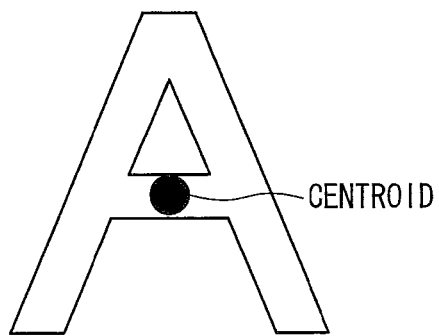
CENTROID
FIG. 7
CHARACTER STRING
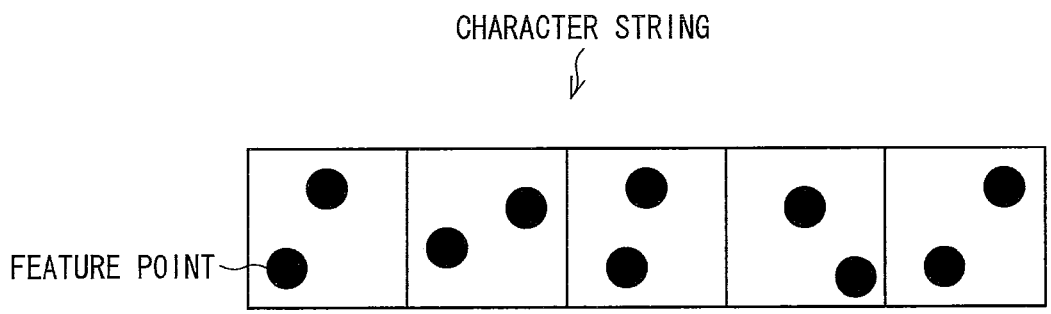
FEATURE POINT

FIG. 12 (a)

| HASH VALUE | INDEX INDICATIVE OF REFERENCE DOCUMENT |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 12 (b)

| HASH VALUE | INDEX INDICATIVE OF REFERENCE DOCUMENT |
|---|---|
| H1 | ID1、ID1 |
| H2 | ID1 |
| H3 | ID1、ID2 |
| H4 | ID1 |
| H6 | ID1、ID2 |
| ⋮ | ⋮ |

FIG. 14

|  | ID1 | ID2 | ID3 | ID4 | ... |
|---|---|---|---|---|---|
| f1 | p1 |  |  |  |  |
| f2 |  |  | p2 |  |  |
| f3 | p3 |  |  |  |  |
| f4 | p4 |  |  |  |  |
| f5 |  |  |  | p5 |  |
| f6 |  | p6 |  |  |  |
| f7 | p7 |  |  |  |  |

INDEX INDICATIVE OF REFERENCE DOCUMENT (columns)
INDEX INDICATIVE OF FEATURE POINT OF REFERENCE DOCUMENT (rows)

FIG. 15

INDEX INDICATIVE OF REFERENCE DOCUMENT

| INDEX INDICATIVE OF FEATURE POINT OF REFERENCE DOCUMENT | ID1 COORDINATES | ID2 COORDINATES | ... |
|---|---|---|---|
| f1 | $(X_{11}, Y_{11})$ | $(X_{21}, Y_{21})$ | ... |
| f2 | $(X_{12}, Y_{12})$ | $(X_{22}, Y_{22})$ | ... |
| f3 | $(X_{13}, Y_{13})$ | $(X_{23}, Y_{23})$ | ... |
| f4 | $(X_{14}, Y_{14})$ | $(X_{24}, Y_{24})$ | ... |

FIG. 17

|   | COORDINATES OF FEATURE POINT OF REFERENCE DOCUMENT | COORDINATES OF FEATURE POINT OF OBJECT DOCUMENT |
|---|---|---|
| 1 | (x1, y1) | (x1', y1') |
| 2 | (x2, y2) | (x2', y2') |
| 3 | (x3, y3) | (x3', y3') |
| 4 | (x4, y4) | (x4', y4') |

IMAGE PROCESSING METHOD, IMAGE PROCESSING APPARATUS, IMAGE FORMING APPARATUS, AND STORAGE MEDIUM

This Nonprovisional application claims priority under 35 U.S.C. §119(a) on Patent Application No. 2008-045116 filed in Japan on Feb. 26, 2008, the entire contents of which are hereby incorporated by reference.

TECHNICAL FIELD

The present invention relates to an image processing method, an image processing apparatus, an image forming apparatus, and a storage medium, each of which allows processing image data indicative of an image having a format.

BACKGROUND ART

Form documents such as account books and vouchers and application documents have been made by writing necessary information in a format sheet printed on paper. However, in recent digitization of information, more number of account books and application documents are made by inputting necessary information in a format of electronic data by use of a computer. Further, paper documents made by writing information in printed formats are read by a scanner etc. to be electronic data, which is stored in a storage medium. In the present specification, electronic data indicative of an image is hereinafter generically referred to as image data.

On the other hand, a technique for matching documents in order to determine a similarity of images has been known, and the technique has been widely used in processing image data. Examples of a method for determining a similarity of image data include: a method in which a keyword is extracted from an image with OCR (Optical Character Reader) so as to carry out matching with the keyword; a method in which a target image is limited to an image with ruled lines and matching is carried out based on features of the ruled lines (see Patent Literature 1).

Further, Patent Literature 2 discloses a technique in which a descriptor is generated from features of an input document, matching between an input document and a document in a document database is performed using the descriptor and a descriptor database that stores the descriptor and that indicates a list of documents including features from which the descriptor is extracted. The descriptor is selected so that the descriptor is invariable to distortion caused by digitalization of the document or to a difference between the input document and a matching document in the document database.

In the technique, when the descriptor database is scanned, votes for individual documents in the document database are accumulated, and a document with the largest number of votes obtained or a document whose number of votes obtained is over a certain threshold value is extracted as a reference document or a similar document.

Furthermore, Patent Literature 3 discloses a technique in which plural feature points are extracted from a digital image, a set of local feature points are determined out of the extracted feature points, a partial set of feature points is selected out of the determined set of local feature points, invariants relative to geometric transformation each as a value characterizing the selected partial set is calculated in accordance with plural combinations of feature points in the partial set, features are calculated by combining the calculated invariants, and a document or an image with the calculated features in a database is voted for, thereby searching a document or an image corresponding to the digital image.

CITATION LIST

Patent Literature 1

Japanese Patent Application Publication, Tokukaihei, No. 8-255236 A (Publication Date: Oct. 1, 1996)

Patent Literature 2

Japanese Patent Application Publication, Tokukaihei, No. 7-282088 A (Publication Date: Oct. 27, 1995)

Patent Literature 3

International Publication No. 2006/092957, pamphlet (Publication Date: Sep. 8, 2006)

Non Patent Literature 1

Tomohiro NAKAI, Koichi KISE, and Masakazu IWAMURA: "Document Image Retrieval and Removal of Perspective Distortion Based on Voting for Cross-Ratios", Meeting on Image Recognition and Understanding (MIRU205) (held by Computer Vision and Image Media Workshop, Information Processing Society of Japan), proceedings, page 538-545

SUMMARY OF INVENTION

Digitization of form documents and application documents allows a user to freely change and use the size of the form documents and the application documents. For example, the user can freely reduce the size of a document from A4 to B5 or enlarge the size of a document from A4 to B4 for use. In particular, in a case where a format is distributed in the form of electronic data, zooming of a document can be performed very freely.

However, in a case where a document whose size is changed from the original size is stored in the form of paper, the document is not in line with other document in the same format, and the size of the document is required to be restored to its original size so that the document is in line with other document. In a case where data of documents are filed and stored, storing the documents with their sizes uniformed requires confirmation of the size of each document, and if the size is changed, restoration of the size of the document to its original size.

Further, in a case where data of documents have been filed and stored, a stored document is read and edited to make a new document. However, if the size of the read document has been changed, the size of the newly made document is different from the original size. Consequently, if the newly made document is printed out as it is, the size of the printed document is different from the size which the user expects. Therefore, in this case, too, it is necessary to restore the size of the document to its original size.

As described above, when the size of a document in a predetermined format is changed, there is a case where the document is difficult and ineffective to use.

An object of the present invention is to provide an image processing method, an image processing apparatus, an image forming apparatus, and a storage medium, each of which allows restoring the changed size of a document in a predetermined format such as a form document and an application document to its original size.

In order to achieve the foregoing object, the image processing apparatus of the present invention is an image processing apparatus that includes a similarity determination process section for comparing features of an image that are extracted from image data of a document to be matched and features of an image of a reference document that has been stored, so as to determine whether the image of the document to be matched is similar to the image of the reference document, the image processing apparatus including a conversion coefficient calculation section for determining whether the document to be matched that is determined by the similarity determination process section as being similar to the reference document has been zoomed with respect to the similar reference document, and when the document to be matched has been zoomed, the conversion coefficient calculation section calculating a conversion coefficient with which the size of the document to be matched is changed to the size of the similar reference document.

With the arrangement, the conversion coefficient calculation section determines whether the document to be matched that is determined by the similarity determination process section as being similar to the reference document has been zoomed with respect to the similar reference document, and when the document to be matched has been zoomed, the conversion coefficient calculation section calculates a conversion coefficient with which the size of the document to be matched is changed to the size of the similar reference document.

Consequently, if the size of the document to be matched has been changed from its original size, it is possible to restore the size of the document to be matched to its original size by converting the image data of the document to be matched by use of the calculated conversion coefficient.

Consequently, even if the size of documents that should be stored with their size uniformed, such as form documents and application documents, are changed and varied, matching the documents by the image processing apparatus allows uniforming the size of the documents. This makes it more convenient to store the documents in the form of paper or in the digitized form or to reuse stored data of the documents.

Image data of a document that is inputted in the image processing apparatus is, for example, image data obtained by reading a document by use of a scanner, or electronic data obtained by inputting necessary information in a format of electronic data by use of a computer (software). That is, the image data is, for example, a computerized image printed or described on paper, or data directly made as electronic data (electronic application document etc.).

In order to achieve the foregoing object, the image processing method of the present invention is an image processing method that includes the step (i) of comparing features of an image that are extracted from image data of a document to be matched and features of an image of a reference document that has been stored, so as to determine whether the image of the document to be matched is similar to the image of the reference document, the image processing method including the step (ii) of determining whether the document to be matched that is determined in the step (i) as being similar to the reference document has been zoomed with respect to the similar reference document, and when the document to be matched has been zoomed, calculating a conversion coefficient with which the size of the document to be matched is changed to the size of the similar reference document.

As already described in the explanation of the image processing apparatus, with the arrangement, it is determined in the step (ii) whether the document to be matched that is determined in the step (i) as being similar to the reference document has been zoomed with respect to the similar reference document, and when the document to be matched has been zoomed, a conversion coefficient with which the size of the document to be matched is changed to the size of the similar reference document is calculated. Consequently, it is possible to restore the size of the document to be matched to it original size by converting image data of the document to be matched by use of the calculated conversion coefficient.

Consequently, even if the size of documents that should be stored with their size uniformed, such as form documents and application documents, are changed and varied, matching the documents by the image processing apparatus allows uniforming the size of the documents. This makes it more convenient to store the documents in the form of paper or in the digitized form or to reuse stored data of the documents.

In order to achieve the foregoing object, the image processing apparatus of the present invention includes the image processing apparatus of the present invention and an image output apparatus capable of printing and outputting image data.

As already described in the explanation of the image processing apparatus, with the arrangement, even if the size of documents that should be stored with their size uniformed, such as form documents and application documents, are changed and varied, matching the documents by the image processing apparatus allows uniforming the size of the documents. This makes it more convenient to store the documents in the form of paper or in the digitized form or to reuse stored data of the documents.

The image processing apparatus may be realized by a computer. In this case, the present invention encompasses a computer-readable storage medium in which a program for causing a computer to function as each section of the image processing apparatus to realize the image processing apparatus is stored.

For a fuller understanding of the nature and advantages of the invention, reference should be made to the ensuing detailed description taken in conjunction with the accompanying drawings.

BRIEF DESCRIPTION OF DRAWINGS

FIG. 3(*a*) is an explanatory drawing illustrating a format document stored in a reference document in the image processing apparatus in FIG. 1. FIG. 3(*b*) is an explanatory drawing illustrating an object document that is obtained by writing information in the format document in FIG. 3(*a*) and that is matched with a reference document in the image processing apparatus in FIG. 1.

FIG. 5 is an explanatory drawing illustrating filter coefficients of a mixed filter included in an MTF correction process section in the feature point calculation section in FIG. 4.

FIG. 6 is an explanatory drawing illustrating examples of a connected area extracted from binarized image data through a process by the feature point calculation section in FIG. 4 and the centroid of the connected area.

FIG. 7 is an explanatory drawing illustrating examples of centroids (feature points) of connected areas extracted from a character string included in binarized image data through a process by the feature point calculation section in FIG. 4.

FIG. 10(a) illustrates an example of a combination of peripheral feature points b, c, and d with respect to a target feature point a. FIG. 10(b) illustrates an example of a combination of peripheral feature points b, c, and e with respect to a target feature point a. FIG. 10(c) illustrates an example of a combination of peripheral feature points b, d, and e with respect to a target feature point a. FIG. 10(d) illustrates an example of a combination of peripheral feature points c, d, and e with respect to a target feature point a.

FIG. 11(a) illustrates an example of a combination of peripheral feature points a, e, and f with respect to a target feature point b. FIG. 11(b) illustrates an example of a combination of peripheral feature points a, e, and c with respect to a target feature point b. FIG. 11(c) illustrates an example of a combination of peripheral feature points a, f, and c with respect to a target feature point b. FIG. 11(d) illustrates an example of a combination of peripheral feature points e, f, and c with respect to a target feature point b.

FIGS. 12(a) and 12(b) are explanatory drawings each illustrating an example of a hash value and an index of a reference document with respect to each feature point that are stored in a memory of the image processing apparatus in FIG. 1.

FIG. 14 is an explanatory drawing illustrating a table indicative of correspondences between feature points of an object document and feature points of a reference document to be voted. The table is stored in the memory of the image processing apparatus in FIG. 1.

FIG. 15 is an explanatory drawing illustrating a table indicative of correspondences between indices of feature points of a reference document and coordinates of the feature points with respect to each reference document. The table is stored in the memory of the image processing apparatus in FIG. 1.

FIG. 17 is an explanatory drawing illustrating correspondences between coordinates of feature points of a reference document and coordinates of feature points of an object document.

DESCRIPTION OF EMBODIMENTS

One embodiment of the present invention is described below with reference to the attached drawings. Note that the present invention is not limited to this embodiment.

Figure 1:
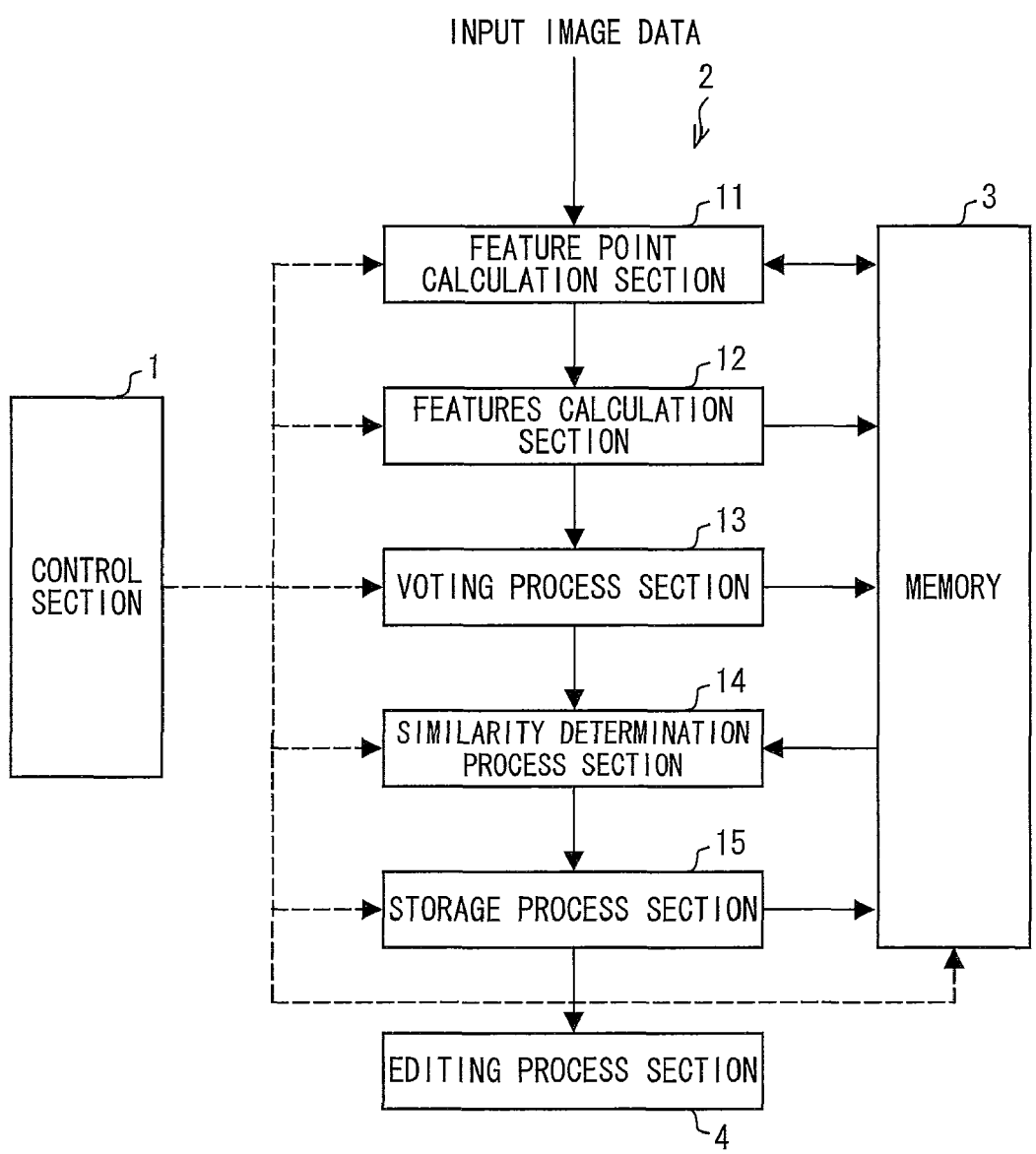
FIG. 1 is a block diagram illustrating a structure of an image processing apparatus of an embodiment of the present invention.

FIG. 1 is a block diagram illustrating a structure of an image processing apparatus 101 of the present embodiment. The image processing apparatus 101 is included in a digital color copying machine (image processing apparatus, image forming apparatus) 102 illustrated in FIG. 2 for example.

The image processing apparatus 101 performs a process in which different information as needed are written in predetermined forms (common formats) such as application documents, contract documents, and questionnaires. The common formats may be documents including ruled lines or documents only including characters with no ruled lines, such as contract documents.

FIGS. 3(a) and 3(b) illustrate an example of a document to be processed by the image processing apparatus 101. The document illustrated in FIGS. 3(a) and 3(b) is an "application for outing" that is an example of form documents and application documents.

FIG. 3(a) is a format document of the original size, whose size is not changed. The format document is stored as a reference document beforehand in the image processing apparatus 101. The reference document is represented by an ID (ID1, ID2, ID3, . . . ) that is an index for identifying individual documents and by features (mentioned later) of an image of the document.

On the other hand, the document illustrated in FIG. 3(b) is a document that is obtained by writing necessary information in the format document of FIG. 3(a) and minimizing the format document. When such document is read, the image processing apparatus 101 determines a similarity between the read document and a reference document. When the read document is similar to the reference document, the image processing apparatus 101 determines whether the document has been zoomed (whether the size of the document has been changed) or not. When the document has been zoomed, the image processing apparatus 1 performs a process for restoring the size of the read document to the size that is the same as that of the reference document.

A document to be matched with a reference document stored beforehand is hereinafter referred to as an object document. In the example of FIGS. 3(a) and 3(b), a format document in which no necessary information is written is used as a reference document. Alternatively, a document obtained by writing necessary information in a format document of original size may be used as a reference document.

As illustrated in FIG. 1, the image processing apparatus 101 includes a control section 1, a document matching process section 2, a memory (storage means) 3, and an editing process section 4. The document matching process section 2 includes a feature point calculation section 11, a features calculation section 12, a voting process section 13, a similarity determination process section 14, and a storage process section 15.

The feature point calculation section 11 extracts connected portions of character strings or ruled lines from image data, and calculates the centroids of the connected portions as feature points. In the present embodiment, the feature point calculation section 11 also calculates coordinates of each feature point.

By use of the feature points calculated by the feature point calculation section 11, the features calculation section 12 calculates features (feature vectors, hash values) that are invariant to rotation, enlargement, and reduction of a document image, i.e. parameters invariant to geometrical change such as rotation, parallel displacement, and enlargement/reduction of the document image. Feature points near a target feature point are used to calculate features.

In a process for matching documents, the voting process section 13 votes for a reference document stored in a later-mentioned hash table, by use of a hash value calculated by the features calculation section 12 with respect to each feature point calculated by the feature point calculation section 11 from image data of an object document. The voting process section 13 votes for a reference document having the same hash value as that of image data of the object document.

The similarity determination process section 14 determines whether the object document is similar to a reference document or not based on the result of the voting process by the voting process section 13. Further, in the present embodiment, in addition to the determination as to whether the object document is similar to a reference document or not, the similarity determination process section 14 determines whether the object document has been zoomed or not, and if so, calculates a conversion coefficient with which the size of the object document is restored to be the same as the size of the reference document (conversion coefficient calculation section).

In a process for matching documents, in accordance with a hash value calculated by the features calculation section 12 with respect to each feature point calculated by the feature point calculation section 11 from image data of a reference document, the storage process section 15 causes an ID indicative of the reference document to be stored.

In the document matching process section 2, the voting process section 13 and the similarity determination process section 14 perform respective processes when the document matching process is performed, and do not perform when the storage process is performed. In contrast thereto, the storage process section 15 operates when performing a storage process, and does not operate when not performing a storage process.

The control section (CPU) 1 controls access to the above process sections in the document matching process section 2 and the memory 3.

When the similarity determination section 14 determines that the object document is similar to the reference document and that the object document has been zoomed and a conversion coefficient with which the size of the object document is restored to be the same as the size of the reference document is searched, the editing process section 4 performs a conversion process for changing an image of the object document to have its original size.

Each section of the image processing apparatus 101 is detailed below with reference to the drawings.

Figure 4:
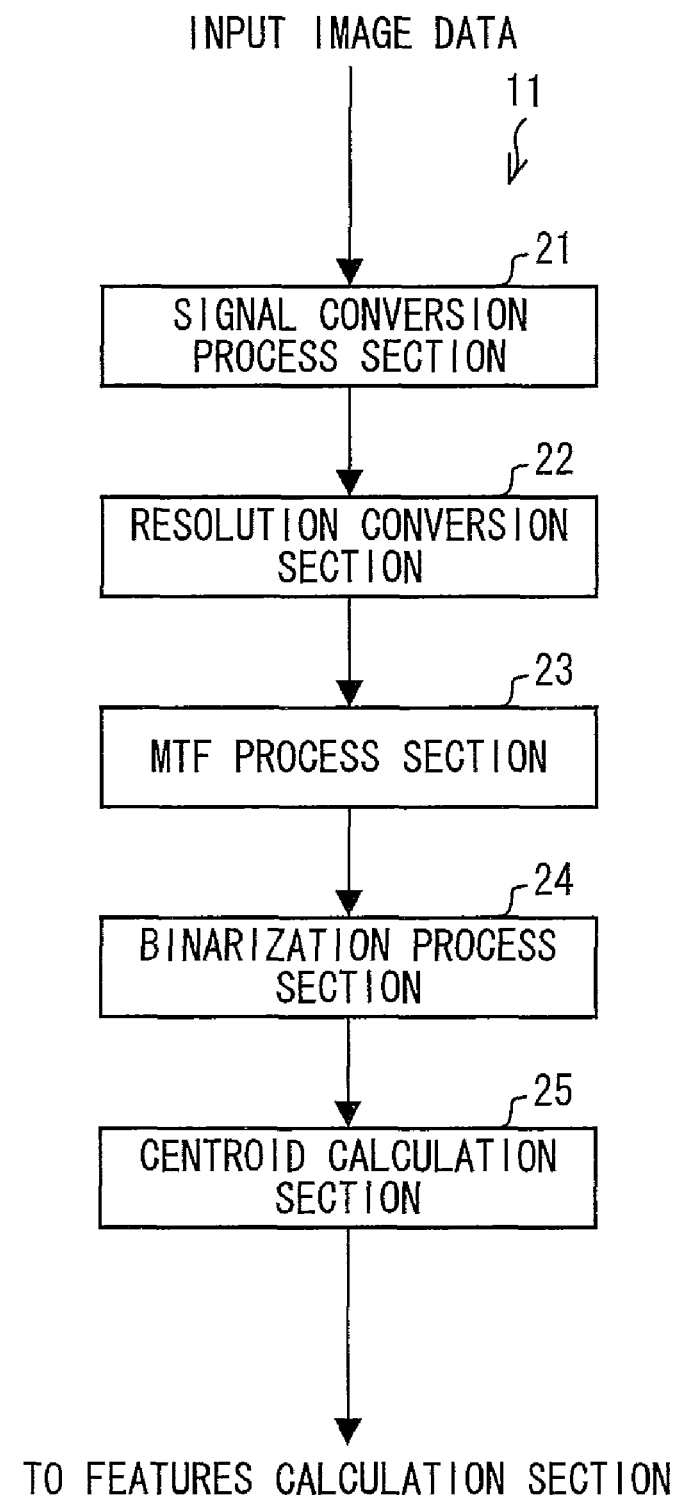
FIG. 4 is a block diagram illustrating a structure of a feature point calculation section in the image processing apparatus in FIG. 1.

As illustrated in FIG. 4, the feature point calculation section 11 includes a signal conversion process section 21, a resolution conversion section 22, an MTF process section 23, a binarization process section 24, and a centroid calculation section 25. FIG. 4 is a block diagram illustrating a structure of the feature point calculation section 11.

When input image data that is image data of a reference document, an object document etc. is indicative of a color image, the signal conversion process section 21 achromatizes the input image data so as to convert the data into a brightness signal or a luminance signal. For example, luminance Y is obtained from the following equation.

$$Y_j = 0.30 R_j + 0.59 G_j + 0.11 B_j \qquad \text{Math. 1}$$

where $Y_j$ represents a luminance value of each pixel and $R_j$, $G_j$, and $B_j$ represent color components of each pixel.

The signal conversion process is not limited to the above method. Alternatively, RGB signals may be converted into CIE1976L*a*b* signals (CIE: Commission International de l'Eclairage, L*: brightness, a*, b*: chromaticity).

In a case where the input image data has been optically enlarged or reduced by an image input apparatus, the resolution conversion section 22 enlarges or reduces the input image data again so as to attain a predetermined resolution of the input image data. An example of the image input apparatus is a scanner for reading a document image and converting the image into image data. In a digital color copying machine illustrated in FIG. 2, a color image input apparatus 111 corresponds to the image input apparatus.

The resolution conversion section 22 is also used for reducing a resolution to be less than a resolution with which an image is read by the image input apparatus at an equal magnification, so that data processing in a subsequent stage is reduced. For example, image data read with 600 dpi (dot per inch) is converted into image data with 300 dpi.

Examples of the method for converting a resolution include: a method for changing scanning speed in a sub-scanning direction and for performing interpolation calculation in a main-scanning direction; and a method for performing interpolation calculation both in a main-scanning direction and a sub-scanning direction. Examples of the method for interpolation calculation used here include a nearest neighbor method, a bi-linear method, and a bi-cubic method.

In the nearest neighbor method, the value of an existing pixel that is nearest to a pixel to be interpolated or the value of a pixel disposed in a predetermined position with respect to a pixel to be interpolated is regarded as the value of the pixel to be interpolated. In the bi-linear method, values of four existing pixels surrounding a pixel to be interpolated are weighted in proportion to distances between the pixel to be interpolated and the four pixels, respectively, an average of the weighted values is calculated, and the average is regarded as the value of the pixel to be interpolated. In the bi-cubic method, not only four pixels surrounding a pixel to be interpolated but also twelve pixels surrounding the four pixels, i.e. sixteen pixels in total, are used in interpolation calculation.

The MTF process section 23 is used to cover the influence due to differences in spatial frequency characteristics of a color image input apparatus among plural kinds of color image input apparatuses. In an image signal outputted from a CCD included in an image input apparatus, MTF deterioration occurs due to an optical component such as a lens or a mirror, an aperture in a light-receiving surface of the CCD, transfer efficiency or afterimage, storage effect or scanning unevenness caused by physical scanning, and a similar cause. The MFT deterioration causes the scanned image to blur. The MTF process section 23 carries out an appropriate filtering process (emphasizing process) so as to recover the blur caused by the MTF deterioration. Further, the MTF process section 23 is used also to suppress an unnecessary high frequency component in a process by a feature point extraction section 31 included in a features calculation section 12 in a later stage. That is, the MTF process section 23 uses a mixing filter (not shown) to carry out an emphasizing process and a smoothing process. Note that, FIG. 5 illustrates examples of filter coefficients of the mixing filter.

The binarization process section 24 compares a luminance value (luminance signal) or a brightness value (brightness signal) of image data achromatized by the signal conversion process section 21 with a threshold value so as to binarize the image data, and causes the binarized image data (binary image data of a reference document and an object document) to be stored in the memory 3.

The centroid calculation section 25 carries out labeling (labeling process) with respect to each pixel of the image data binarized by the binarization process section 24 (for example, image data represented by "1" or "0"). In the labeling, the same label is given to pixels with the same value out of two values. Further, a connected area made of pixels each having the same label is specified. A centroid of the specified connected area is extracted as a feature point, and the extracted feature point is outputted to the features calculation section 12. Note that the feature point can be expressed by coordinate values (x coordinate, y coordinate) of a binary image. The coordinate values of the feature point are also calculated and are outputted to the features calculation section 12.

FIG. 6 is an explanatory drawing illustrating examples of the connected area extracted from the binarized image data and a centroid of the connected area. In this figure, the connected area corresponding to a character "A" and the centroid thereof are illustrated. Further, FIG. 7 is an explanatory drawing illustrating an example of centroids (feature points) of plural connected areas extracted from a text string included in the binarized image data.

Figure 8:
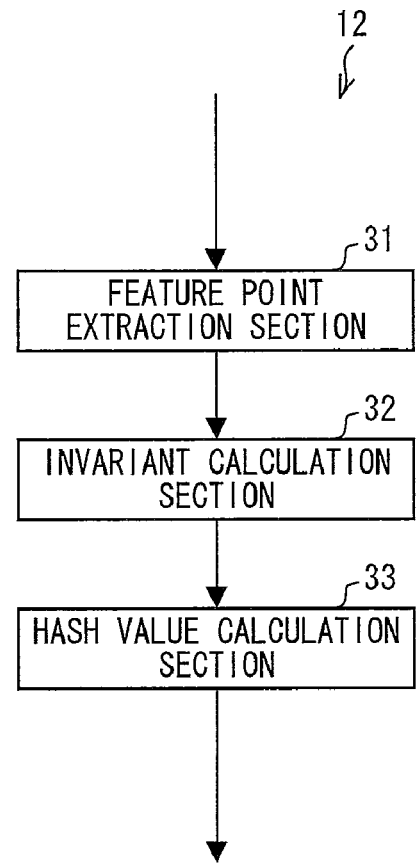
FIG. 8 is a block diagram illustrating a structure of a features calculation section in the image processing apparatus in FIG. 1.

As illustrated in FIG. 8, the features calculation section 12 includes the feature point extraction section 31, an invariant calculation section 32, and a hash value calculation section 33. FIG. 8 is a block diagram illustrating a structure of the features calculation section 12.

Figure 9:
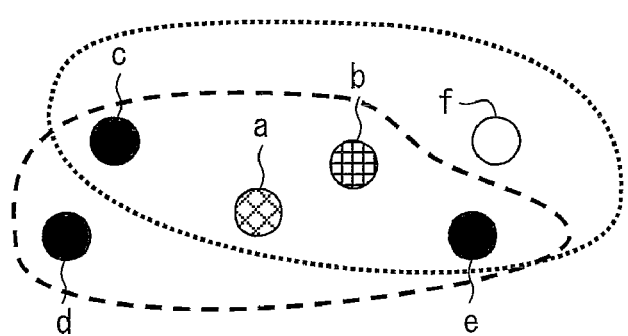
FIG. 9 is an explanatory drawing illustrating how a feature point extraction section in the features calculation section in FIG. 8 extracts peripheral feature points with respect to a target feature point.

When a plurality of feature points calculated by the feature point calculation section 11 exist in image data, the feature point extraction section 31 regards only one feature point as a target feature point and sequentially extracts peripheral feature points around the target feature point in such order that a feature point nearer to the target feature point is more preferentially extracted so as to extract a predetermined number of feature points. In the example of FIG. 9, the predetermined number of feature points is four, and four feature points b, c, d, and e are extracted as peripheral feature points in case where a feature point a is regarded as a target feature point, and four feature points a, c, e, and f are extracted as peripheral feature points in case where a feature point b is regarded as a target feature point.

Further, the feature point extraction section 31 extracts a combination of three points which can be selected from the four peripheral feature points extracted in the foregoing manner. For example, as illustrated in FIGS. 10(a) to 10(d), in case where a feature point a in FIG. 9 is regarded as a target feature point, a combination of three peripheral feature points out of the peripheral feature points b, c, d, and e, that is, a combination of the peripheral feature points b, c, and d, a combination of the peripheral feature points b, c, and e, a combination of the peripheral feature points b, d, and e, and a combination of the peripheral feature points c, d and e are extracted.

Next, the invariant calculation section 32 calculates an invariant (one of features) Hij relative to geometrical transformation, with respect to each combination extracted by the feature point extraction section 31.

Herein, "i" represents the number of target feature point(s) (i is an integer not less than 1), and "j" represents the number of combinations of three peripheral feature points (j is an integer not less than 1). In the present embodiment, a ratio of lengths of two lines connecting the peripheral feature points is set as the invariant Hij.

The lengths of the lines are calculated in accordance with coordinates of the peripheral feature points. For example, in FIG. 10(a), when a length of a line connecting the feature point b and the feature point c is A11 and a length of a line connecting the feature point b and the feature point d is B11, the invariant H11 is such that H11=A11/B11. Further, in FIG. 10(b), when a length of a line connecting the feature point b and the feature point c is A12 and a length of a line connecting the feature point b and the feature point e is B12, the invariant H12 is such that H12=A12/B12. Further, in FIG. 10(c), when a length of a line connecting the feature point b and the feature point d is A13 and a length of a line connecting the feature point b and the feature point e is B13, the invariant H13 is such that H13=A13/B13. Further, in FIG. 10(d), when a length of a line connecting the feature point c and the feature point d is A14 and a length of a line connecting the feature point c and the feature point e is B14, the invariant H14 is such that H14=A14/B14. In this manner, the invariants H11, H12, H13, and H14 are calculated in the examples illustrated in FIGS. 10(a) to 10(d).

Note that, in the foregoing examples, a line connecting a peripheral feature point positioned closest to the target feature point and a peripheral feature point positioned second-closest to the target feature point is indicated as Aij and a line connecting a peripheral feature point positioned closest to the target feature point and a peripheral feature point positioned third-closest to the target feature point is indicated as Bij, but the definition is not limited to this, and the lines used to calculate the invariant Hij may be set in any manner.

The hash value calculation section 33 calculates a remainder of the following expression as a hash value (one of features) Hi and causes the calculated Hi to be stored in the memory 8.

$$Hi=(Hi1\times10^3+Hi2\times10^2+Hi3\times10^1+Hi4\times10^0)/D$$

where D is a constant number which is set beforehand according to a range which is to be set as a remainder value range.

How to calculate the invariant Hij is not particularly limited. For example, a value calculated in accordance with a cross-ratio of five points in the vicinity of the target feature point, or a value calculated in accordance with a cross-ratio of five points extracted from n points in the vicinity of the target feature point (n is such an integer that $n \geq 5$), or a value calculated in accordance with an arrangement of m points extracted from n points in the vicinity of the target feature point (m is such an integer that $m<n$ and $m \geq 5$) and a cross-ratio of five points extracted from the m points may be set as the invariant Hij relative to the target feature point. Note that, the cross-ratio is a value calculated from four points in a straight line or from five points on a plane and is known as an invariant relative to projective transformation which is a kind of geometric transformation.

Further, an expression for calculating the hash value Hi is not limited to the foregoing expression, and other hash function (for example, any one of hash functions mentioned in Patent Literature 2) may be used.

When extraction of peripheral feature points around a target feature point and calculation of the hash value Hi are completed, each section of the features calculation section 12 focuses on another feature point to change the target feature point and calculates a hash value. In this manner, each section of the features calculation section 12 calculates hash values corresponding to all the feature points.

In FIG. 9, when extraction of peripheral feature points around a feature point a regarded as a target feature point and calculation of a hash value are completed, peripheral feature points around a feature point b regarded as a target feature point are extracted and a hash value is calculated. In FIG. 9, four feature points a, c, e, and f are extracted as peripheral feature points in case where the feature point b is regarded as a target feature point.

Figure 11:
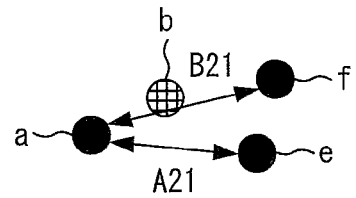
FIGS. 11(a), 11(b), 11(c), and 11(d) are explanatory drawings each illustrating an example of a combination of three peripheral feature points that are selectable when one of the four peripheral feature points extracted by the feature point extraction section in FIG. 8 is regarded as a target feature point.
Figure 11:
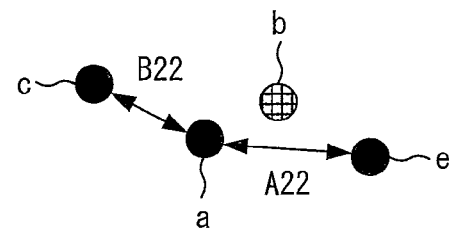
Figure 11:
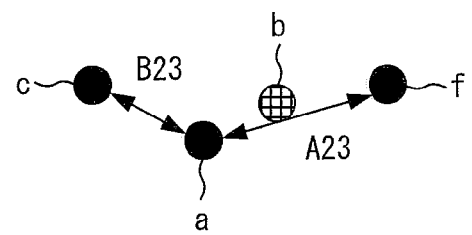
Figure 11:
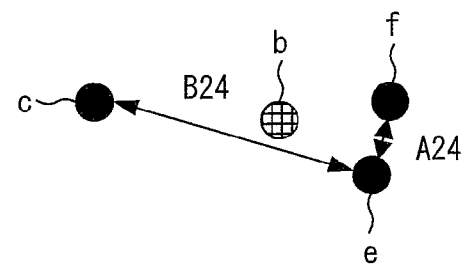

Further, as illustrated in FIGS. 11(*a*) to 11(*d*), a combination of three points (peripheral feature points a, e, and f, peripheral feature points a, e, and c, peripheral feature points a, f, and c, and peripheral feature points e, f, and c) selected from the peripheral feature points a, c, e, and f is extracted and a hash value corresponding to the combination is calculated, and the calculated hash value is stored in the memory 8. Further, this process is repeated so as to correspond to the number of the feature points, thereby calculating hash values corresponding to the respective feature points each of which is regarded as the target feature point. Then, the calculated hash values are stored in the memory 8.

In case of storing the input image data as a reference image, the features calculation section 12 transmits the hash value (features) calculated in the foregoing manner and corresponding to each feature point of the input image data (image data of a reference document) to the storage process section 15.

The storage process section 15 sequentially stores (i) hash values calculated by the features calculation section 12 and corresponding to the respective feature points and (ii) IDs each indicative of a reference document of the input image data to a hash table (not shown) provided in the memory 3 (see FIG. 12(*a*)). In case where the hash values have already been stored, the IDs are stored in such a manner as to correspond to the hash values. IDs are serially assigned to respective documents without any duplication.

Note that, in case where the number of documents stored in the hash table is larger than a predetermined value (for example, 80% of the number of documents which can be stored), old IDs may be searched and sequentially deleted. Further, the deleted IDs may be reused as IDs of new input image data. Further, in case where the calculated hash values are identical with each other (H1=H5 in FIG. 12(*b*)), these values may be collectively stored into the hash table.

Further, in case of the document matching process, the features calculation section 12 transmits, to the voting process section 13, the hash value calculated in the foregoing manner and corresponding to each feature point of input image data (image data of an object document).

Figure 13:
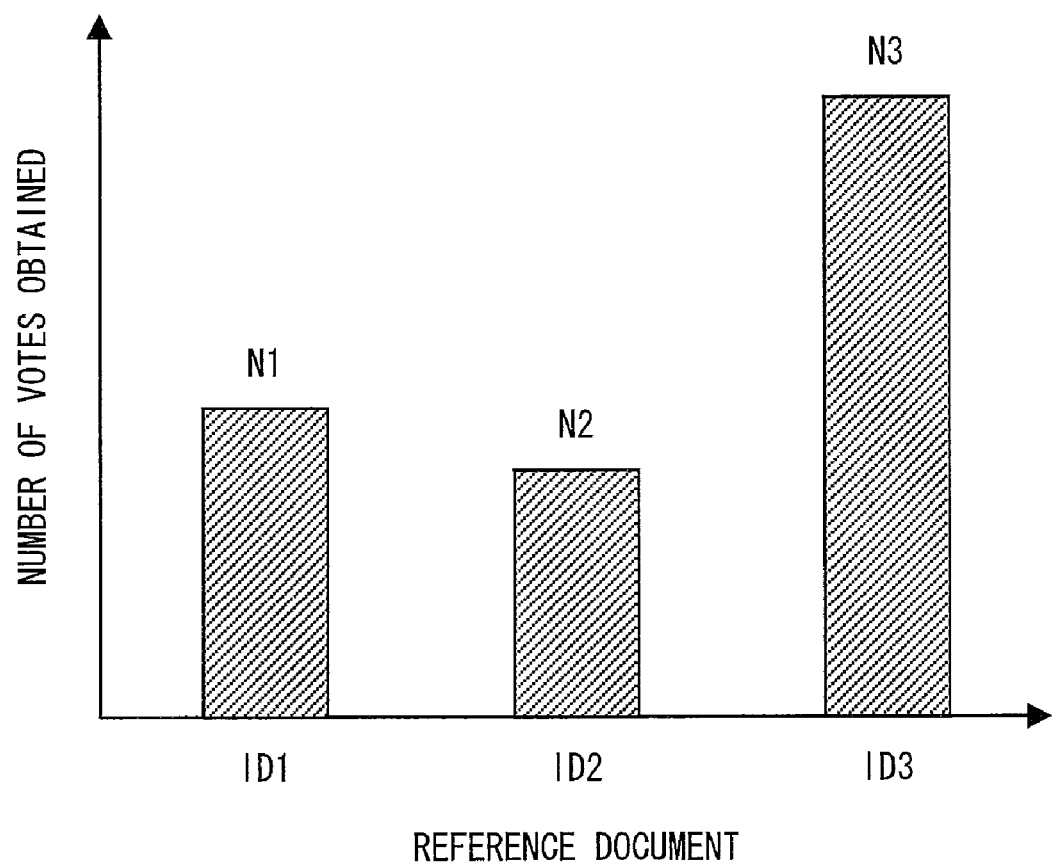
FIG. 13 is a graph illustrating an example of the result of voting by a voting process section in the image processing apparatus in FIG. 1.

The voting process section 13 compares the hash value calculated from the input image data and corresponding to each feature point with the hash value stored in the hash table so as to vote for a reference document having the same hash value (see FIG. 13). FIG. 13 is a graph showing an example of the number of voting for three reference documents ID1, ID2, and ID3. In other words, the voting process section 13 counts the number of times the same hash value as a hash value of the reference document is calculated from the input image data for each reference document, and causes the counted number to be stored in the memory 3.

In FIG. 12(*b*), H1=H5 and these values are collectively stored in the hash table. Among the values stored in the hash table, when a hash value calculated from input image data of an object document includes Hi, the reference document ID1 is voted for two times.

The similarity determination process section 14 extracts, from a vote result of the voting process section 13, an ID of a reference document with the maximum number of votes obtained and the maximum number of votes obtained. Further, the similarity determination process section 14 compares the maximum number of votes obtained with a predetermined threshold value so as to calculate a similarity, or the similarity determination process section 14 divides the extracted number of votes obtained by the maximum number of votes of the document and normalizes the result so as to compare the result with a predetermined threshold value. The threshold value may be set to 0.8 or more. When the document includes a hand-written part, the number of votes may exceed the maximum number of votes obtained. Consequently, there is a case where the similarity is more than 1.

Figure 10:
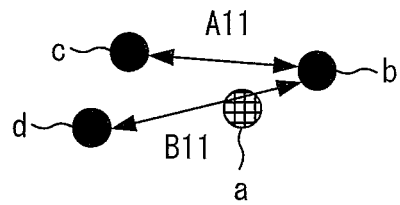
FIGS. 10(a), 10(b), 10(c), and 10(d) are explanatory drawings each illustrating an example of a combination of three peripheral feature points selectable from four peripheral feature points extracted by the feature point extraction section in FIG. 8.
Figure 10:
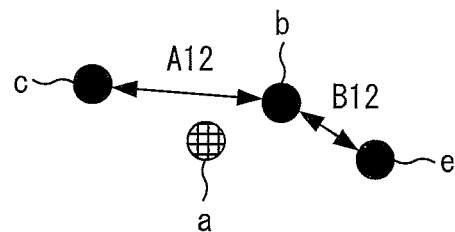
Figure 10:
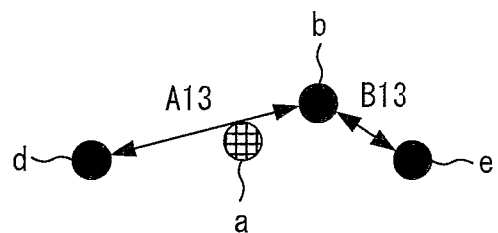
Figure 10:
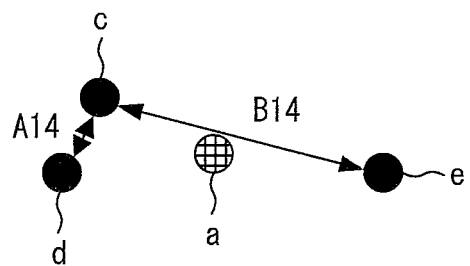

The maximum number of votes obtained is represented by the number of hash values that is calculated by multiplying the number of feature points by one feature point (target feature point). FIGS. 9, 10, and 11 illustrate a simplest example in which a single hash value is calculated for a single feature point, but the present invention is not limited to this example. With a different method for selecting feature points around a target feature point, a plurality of hash values are calculated for a single feature point. For example, assume that six points are extracted as peripheral feature points around the target feature point. There are six combinations of extracting five points from the six points. Three points are extracted from the five points for each of the six combinations, so as to calculate an invariant, thereby calculating a hash value.

Further, the similarity determination process section 14 calculates a positional relationship between feature points of an object document and feature points of a reference document having the same hash values as those of the object document. That is, the similarity determination process section 14 performs positioning of the feature points of the object document and the feature points of the reference document. Then, as illustrated in FIG. 14, the similarity determination process section 14 stores which feature point of the object document votes for which feature point of the reference document. p (p1, p2, p3, . . . ) is an index indicative of each feature point of the object document and f (f1, f2, f3, . . . ) is an index indicative of each feature point of the reference document.

Further, as illustrated in FIG. 15, f indicative of each feature point of the reference document and coordinates of each feature point on an image of the reference document are stored beforehand and matching determination is performed also in view of coordinate positions.

In the example of FIG. 14, features (hash values) of the feature point p1 of the object document are identical with features (hash values) of the feature point f1 of the reference document ID1, and features (hash values) of the feature point p2 of the object document is identical with the feature point f2 of the reference document ID3 (this is described in Non-patent Literature 1).

In the present embodiment, based on the positional relationship between feature points of an object document and feature points of a reference document having the same hash values as those of the object document, the similarity determination process section 14 also determines whether the object document has been enlarged or reduced with respect to the reference document that is determined as being similar to the object document. When the object document has been enlarged or reduced with respect to the reference document, the similarity determination process section 14 calculates a conversion coefficient with which the size of the object document is restored to the size of the reference document.

The following explains how to calculate a conversion coefficient. The similarity determination process section 14 calculates the positional relationship between the feature points of the object document and the feature points of the reference document, and converts coordinates of data of the object document by use of the calculated relational expression. Since the object document having been subjected to the zooming process is enlarged or reduced with respect to the reference document, it is necessary to grasp the positional relationship between the feature points of the object document and the feature points of the reference document. Therefore, the coordinate system of the read object document is converted into the coordinate system of the reference document and positioning thereof is performed.

Figure 16:
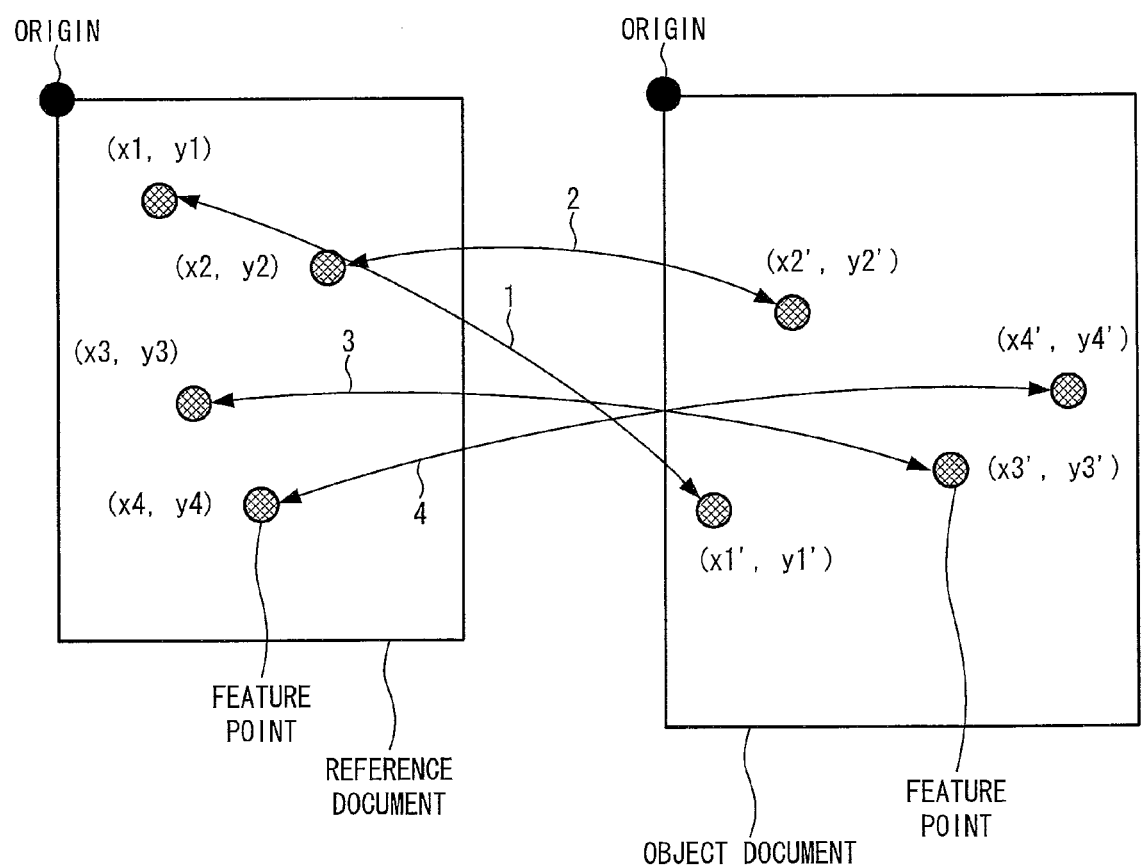
FIG. 16 is an explanatory drawing illustrating how to make positioning of a reference document and an object document on the basis of feature points of the reference document and feature points of the object document having the same features (hash values) as those of the reference document.

Specifically, on the basis of the result of FIG. 15, the similarity determination process section 14 obtains correspondences between coordinates of feature points of the reference document and coordinates of feature points of the read object document having the same features (hash values) as those of the object document. FIG. 16 is an explanatory drawing illustrating how to make positioning of the reference document and the object document having the same features (hash values) as those of the reference document, on the basis of the feature points of the reference document and the feature points of the object document. FIG. 17 is an explanatory drawing illustrating correspondences between coordinates of the feature points of the reference document and coordinates of the feature points of the object document, which correspondences are obtained as a result of the positioning of the reference document and the object document. The examples of FIGS. 16 and 17 show a case where there are four feature points at which features match between the reference document and the object document.

The similarity determination process section 14 calculates a conversion coefficient A in accordance with the following equations $$Pout = \begin{pmatrix} x1 & y1 & 1 \\ x2 & y2 & 1 \\ x3 & y3 & 1 \\ x4 & y4 & 1 \end{pmatrix},$$ Math. 2

$$Pin = \begin{pmatrix} x1' & y1' & 1 \\ x2' & y2' & 1 \\ x3' & y3' & 1 \\ x4' & y4' & 1 \end{pmatrix},$$

$$A = \begin{pmatrix} a & b & c \\ d & e & f \\ g & h & i \end{pmatrix}$$

$$Pout = Pin \times A$$ Math. 3 where Pin represents a matrix for coordinates of the feature point of the reference document, Pout represents a matrix for coordinates of the feature point of the object document, and A represents a conversion coefficient.

Since Pin is not a square matrix, both sides of Pin are multiplied with $Pin^T$ that is a transposed matrix of the Pin, and are further multiplied with an inverse matrix of $Pin^T Pin$.

$$Pin^T Pout = Pin^T Pin \times A$$ Math. 4

$$(Pin^T Pin)^{-1} Pin^T Pout = A$$

By use of the conversion coefficient A thus obtained, coordinates of the object document on the reference document are calculated. In this calculation, as shown in the following expression, any coordinates (x, y) on the reference document are converted into coordinates (x', y') on the object document by use of the conversion coefficient A.

$$(x, y, 1) = (x', y', 1) \times A$$ Math. 5

Thus, the size of the object document can be restored to the size of the reference document. A process for calculating coordinates of the object document on the reference document is carried out by the editing process section 4. The similarity determination process section 14 transmits the calculated conversion coefficient A to the editing process section 4.

Another method is as follows: feature points at which features are determined as matching between the reference document and the object document are extracted, a ratio of distance between the feature points is calculated, and using the calculated ratio of distance, document image data is converted.

Figure 18:
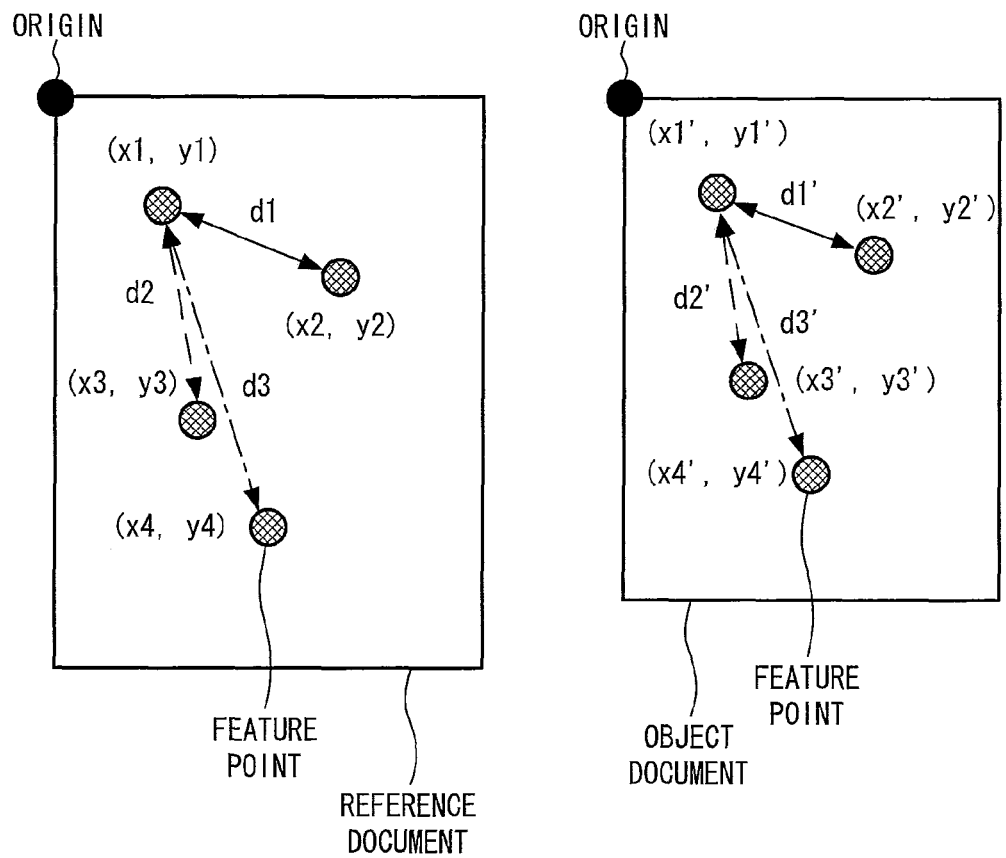
FIG. 18 is an explanatory drawing illustrating how to calculate a ratio of a distance between feature points of a reference document to a distance between feature points of an object document, by use of feature points at which features (hash values) match.

FIG. 18 is an explanatory drawing illustrating how to calculate a ratio of a distance di between the feature points of the reference document to a distance di' between the feature points of the object document (the ratio is Ri=di/di'), by use of feature points at which features (hash values) match. The example in FIG. 18 shows a case where there are four feature points at which features (hash values) match between the reference document and the object document.

In FIG. 18, a ratio of a distance d1 between a feature point (x1, y1) and a feature point (x2, y2) to a distance d2 between a feature point (x1', y1') and a feature point (x2', y2') is d1/d1'.

Figure 19:
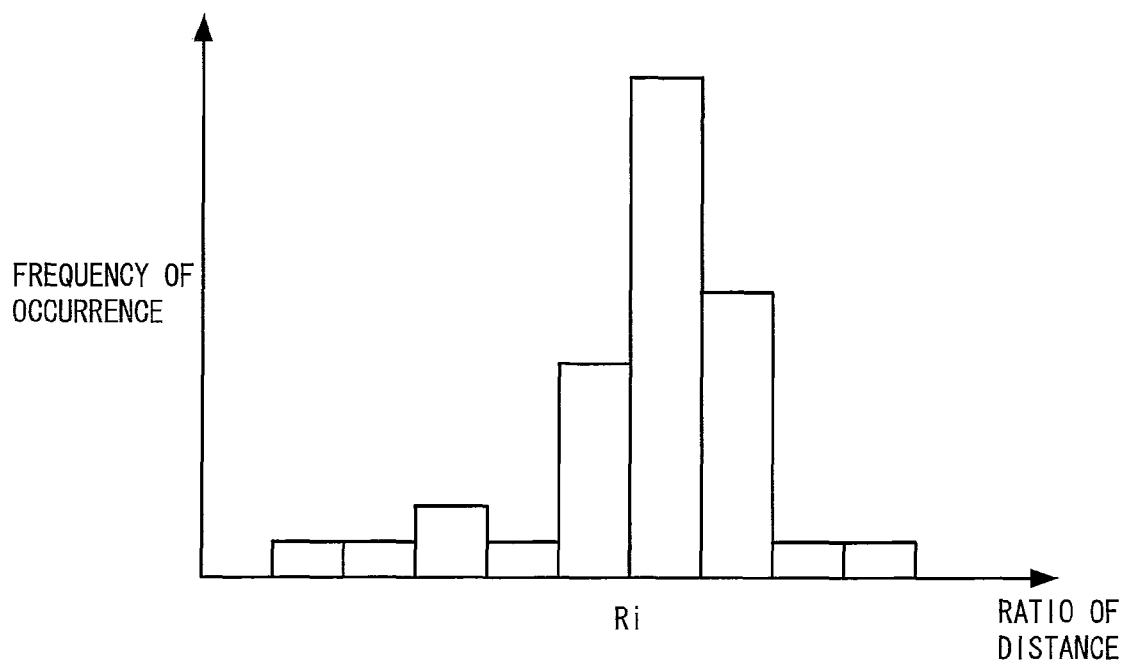
FIG. 19 is a histogram illustrating a ratio of a distance between feature points of a reference document to a distance between feature points of an object document.

In a case where the ratio of distances is used as the conversion coefficient in this manner, a histogram of the ratio Ri of distances is prepared as illustrated in FIG. 19 for example, and a value with the largest frequency of occurrence is regarded as the conversion coefficient. Feature points with which the ratio of distances is calculated may be all feature points at which features match, or may be a part of all the feature points.

Further another method is as follows: when the object document is read, a user is requested to select the size of the object document by use of the operational panel 114 (see FIG. 2), the similarity determination process section 14 determines whether the object document is similar to the reference document or not, and when the similarity determination process section 14 determines that the object document is similar to the reference document, it is determined whether the selected size of the object document is identical with the size of the similar reference document or not. When the selected size of the object document is not identical with the size of the similar reference document, a command of a predetermined zooming process for changing the size of the object document to the size of the similar reference document is transmitted to the editing process section 4.

For example, assume that a user uses an application document in A3 size. When the user causes an image input apparatus to scan the application document and instructs copying or filing of the application document, the user is requested to input the size of the application document and the user manually selects A3 that is the size of the application document. When it is determined in the document matching process that a reference document similar to the application document exists and the size of the reference document is A4, a command of a predetermined zooming process for changing A3 size to A4 size is given to image data obtained by scanning the application document in A3 size.

Further, in a case of an image input apparatus having a function of detecting the size of a document on a scanner platen in main-scanning and sub-scanning directions by use of a photoelectric conversion element such as a phototransistor provided in the image input apparatus, the size of an object document can be detected by use of the function instead of manual selection of the size by the user.

The editing process section 4 is a conversion process section for converting an image of the object document. When the conversion coefficient A is used as in the above method, the editing process section 4 obtains, by use of the conversion coefficient A, coordinates on the object document which correspond to coordinates on the reference document into which the coordinates of the object document are to be converted. Note that the coordinates on the object document which correspond to the coordinates on the reference document are not necessarily correspond to one pixel (coordinate values may include decimals as a result of coordinate conversion). That is, the coordinates may indicate a position between pixels. In this case, interpolation calculation is used. Examples of the interpolation calculation include the nearest neighbor method, the bi-linear method, and the bi-cubic method that are explained above.

Further, when filing the object document, the editing process section 4 may store image data of the object document having been subjected to the zooming process, or may store image data of the object document having not been subjected to the zooming process, together with the conversion coefficient A as information related to the image data (information addition process section).

The user may be urged to select subsequent processes in accordance with the result of determination by the document matching process. The method for urging the user may be a method for displaying a window for urging the user to select a process, such as (1) printing object document data without change of the size thereof, (2) printing object document data with change of the size thereof, (3) filing object document data with change of the size thereof, and (4) filing object document data inputted without change of the size thereof and a conversion coefficient therefor.

In a case of a computer system, it is preferable to design the computer system so that reading conditions of an image input apparatus are selected in a setting window of a scanner driver for setting the reading conditions of the image input apparatus.

Figure 2:
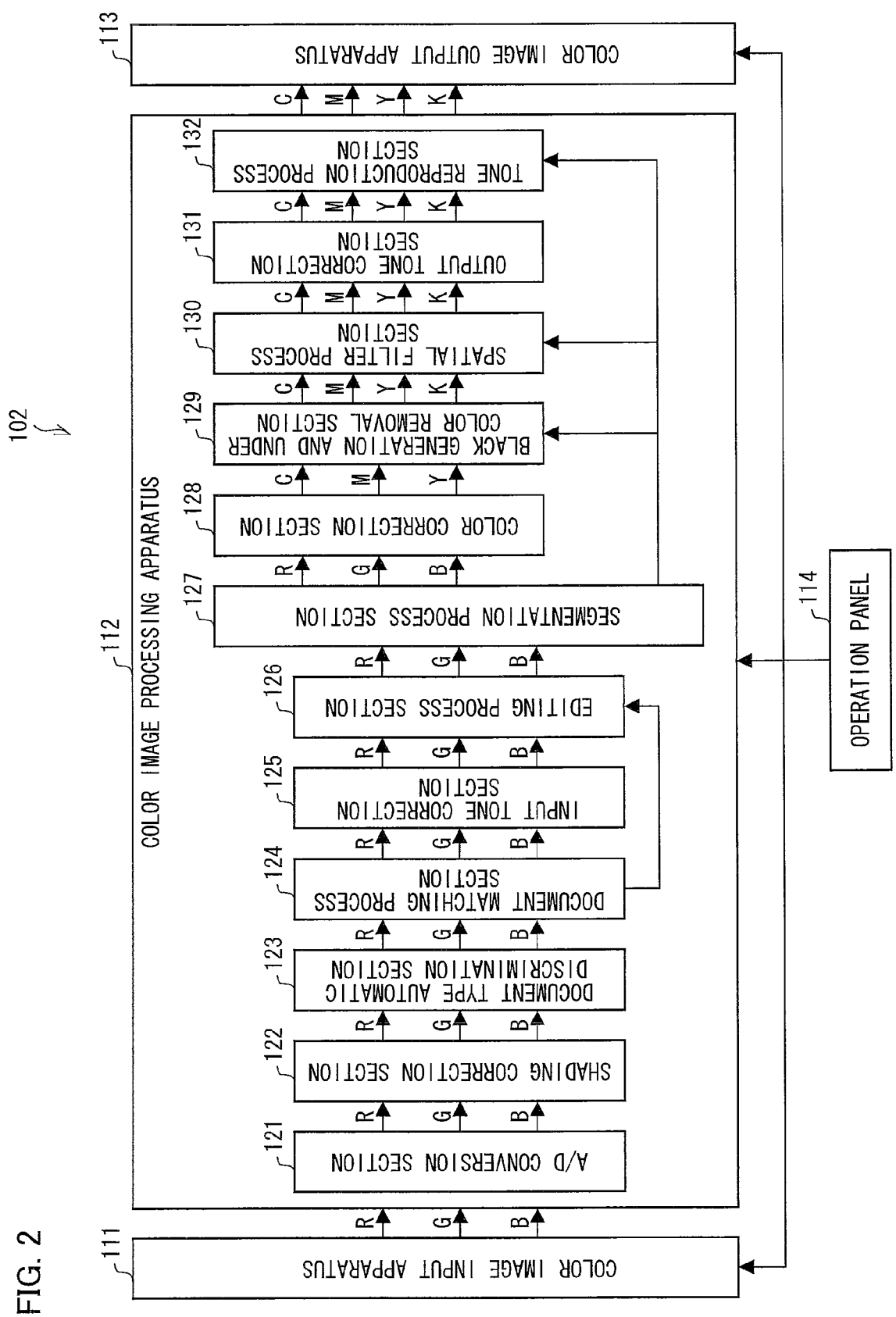
FIG. 2 is a block diagram illustrating a structure of a digital color copying machine including the image processing apparatus in FIG. 1.

The following explains a structure of the digital color copying machine 102 including the image processing apparatus 101. FIG. 2 is a block diagram illustrating a structure of the digital color copying machine 102.

As illustrated in FIG. 2, the digital color copying machine 102 includes the color image input apparatus 111, a color image processing apparatus 112, a color image output apparatus 113, and the operational panel 114.

The color image input apparatus 111 includes a scanner section including a device for converting optical information from a CCD (Charge Coupled Device) into electric signals, and outputs as RGB analog signals an optical image reflected from a document.

The analog signals read by the color image input apparatus 111 are transmitted in the color image processing apparatus 112 through an A/D conversion section 121, a shading correction section 122, a document type automatic discrimination section 123, a document matching process section 124, an input tone correction section 125, an editing process section 126, a segmentation process section 127, a color correction section 128, a black generation and under color removal section 129, a spatial filter process section 130, an output tone correction section 131, and a tone reproduction process section 132 in this order, and are output to the color image output apparatus 113 as CMYK digital color signals.

The A/D conversion section 121 converts the RGB analog signals into RGB digital signals. The shading correction section 122 removes various distortions produced in an illumination system, an image focusing system, and an image sensing system of the color image input apparatus 111 from the RGB digital signals transmitted from the A/D conversion section 121. Moreover, the shading correction section 122 adjusts color balance of the RGB digital signals.

The document type automatic discrimination section 123 determines whether the read document is a character document, a printed photograph document, or a character-printed photograph document in which characters and printed photographs are mixed, in accordance with the RGB signals (RGB density signals) from which the various distortions have been removed and whose color balance has been adjusted.

The document matching process section 124 corresponds to the document matching process section 2 in the image processing apparatus 101. That is, the document matching process section 124 performs a feature point calculation process and determines, by use of the result of the feature point calculation process, a similarity between an object document and a reference document that is stored beforehand. When the object document is similar to the reference document and the object document has been zoomed with respect to the reference document, the document matching process section 124 calculates a conversion coefficient with which the size of the object document is restored to the size of the reference document, and outputs the conversion coefficient to the editing process section 126.

The document matching process section 124 outputs the input RGB signals to the input tone correction section 125 in a later stage without changing the RGB signals.

The input tone correction section 125 subjects the RGB signals from which the various distortions have been removed by the shading correction section 122 to an image quality adjustment process such as removal of background density and adjustment of contrast.

The editing process section 126 corresponds to the editing process section 4 of the image processing apparatus 101. That is, when the document matching process section 124 determines that the object document is similar to the reference document and has been subjected to the zooming process, the editing process section 126 carries out a process for converting the size of the object document into the size of the reference document by use of the conversion coefficient calculated by the document matching process section 124. When the object document has not been subjected to the zooming process or when the object document is not determined as being similar to the reference document, the editing process section 126 does not carry out the process and outputs the RGB signals to the segmentation process section 127 in the later stage without changing the RGB signals.

The segmentation process section 127 separates each pixel of an input image into either one of a character region, a halftone dot region, or a photograph (continuous tone) region, according to the RGB signals. On the basis of a result of the separation, the segmentation process section 127 outputs a segmentation class signal, indicating which region a pixel of the input image belongs to, to the black generation and under color removal section 129, the spatial filter process section 130, and the tone reproduction process section 132. The segmentation process section 15 also outputs the input signals as received from the editing process section 126 to the subsequent color correction section 128 without any modification.

The color correction section 128 removes color impurity on the basis of spectral characteristics of CMY color materials including an unnecessarily absorption component, in order to realize a faithful color reproduction.

The black generation and under color removal section 129 performs (i) a black generation process for generating a black (K) signal from three color (CMY) signals after the color correction processing and (ii) a process for generating new CMY signals by removing the K signal obtained by the black generation process from the original CMY signals. As a result, the three CMY signals are converted into four CMYK signals.

With the use of a digital filter, the spatial filter process section 130 performs a spatial filter process on the basis of a segmentation class signal, with respect to image data which is received in the form of the CMYK signals from the black generation and under color removal section 129. In the spatial filter process, the spatial filter process section 130 corrects a spatial frequency characteristic, so as to reduce blur or granularity deterioration in an output image.

The tone reproduction process section 132, as with the spatial filter process section 130, performs a later-mentioned predetermined process with respect to the image data in the form of the CMYK signals, on the basis of the segmentation class signal.

For example, in the region separated into a text region by the segmentation process section 129, the spatial filter process section 130 employs a spatial filter greatly emphasizing a high frequency component, in order to improve reproducibility of characters. Concurrently, the tone reproduction process section 132 carries out either a binary process or a multi-level dithering process on a high-resolution screen suitable for reproducing the high frequency component.

In the region separated into a halftone dot region by the segmentation process section 127, the spatial filter process section 130 performs a low pass filter process for removing an input halftone dot component. The output tone correction section 132 performs the output tone correction process in which a signal such as a density (pixel value) signal is converted into a halftone dot area rate that is characteristics of the color image output apparatus 113. Subsequently, the tone reproduction process section 132 performs the tone reproduction process so that, ultimately, an image is segmented into pixels and each tone of the pixels can be reproduced. In the region separated into a photograph region by the segmentation process section 127, the binary processing or the multi-level dithering is performed on a screen suitable for tone reproduction.

The image data which has been subjected to each of the processes mentioned above is temporarily stored in a storage device (not shown). The image data is read from the storage device at a predetermined timing and supplied to the color image output apparatus 113.

The color image output apparatus 113 outputs the image data to a printing medium such as paper. The color image output apparatus 113 is not particularly limited and may be a color image output apparatus which uses an electrophotographic method or an ink-jet method. The above processes are controlled by a CPU (Central Processing Unit) (not shown).

Figure 20:
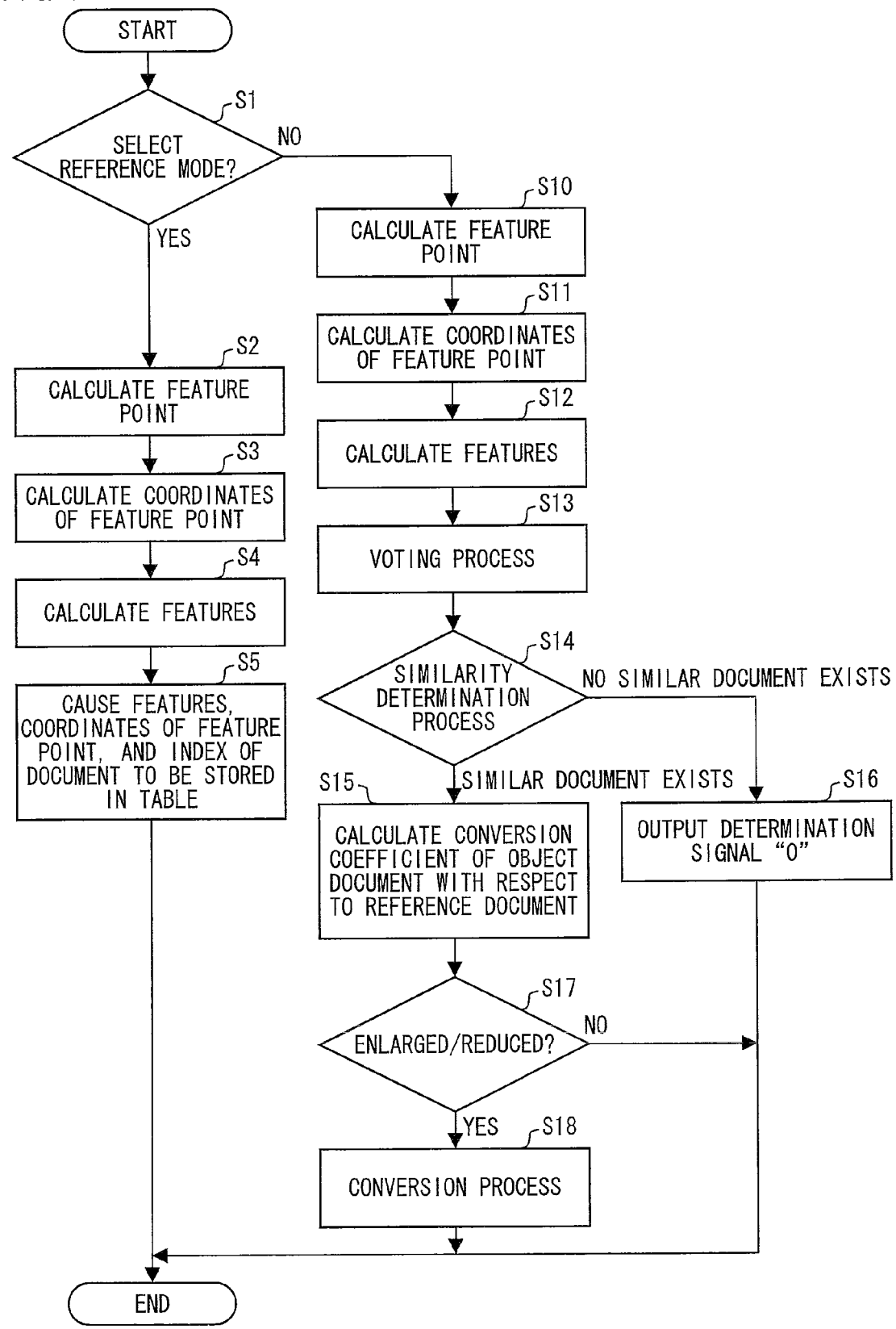
FIG. 20 is a flow chart illustrating an operation of the image processing apparatus in FIG. 1.

With respect to the above structure, the following explains how the image processing apparatus 101 of the present embodiment functions with reference to the flowchart in FIG. 20.

In the image processing apparatus 101, a control section 1 determines whether a storage mode is selected or not (S1). Selection of the storage mode is made by operating the operational panel 114 of the digital color copying machine 102. Further, in an image processing system including the image processing apparatus 101 and a terminal apparatus (computer) connected with the image processing apparatus 101, selection of the storage mode is made by input via the terminal apparatus.

In a case where the storage mode is selected, the feature point calculation section 11 calculates, on the basis of input image data, feature points of a document to be stored (S2), and calculates coordinates of each of the feature points (S3).

Subsequently, the features calculation section 12 calculates features of each feature point calculated by the feature point calculation section 11 (S4), and the storage process section 16 causes features (hash values) of a feature point, index f of the feature point, and coordinates of the feature point to be stored in the memory 3 with respect to each feature point of the document to be stored, and finishes the operation (S5). This provides a table showing f indicative of each feature point of the document to be stored and coordinates of the feature point on an image of the document to be stored.

On the other hand, in a case where the storage mode is not selected in S1, the control section 1 determines that a matching mode is selected, and goes to S10. In S10, the feature point calculation section 11 calculates, on the basis of input image data, feature points of an object document to be matched, and calculates coordinates of each of the feature points (S11).

Subsequently, the features calculation section 12 calculates features of each feature point calculated by the feature point calculation section 11 (S12), and the voting process section 13 carries out a voting process by use of the calculated features of the object document (S13).

Next, the similarity determination process section 14 determines which reference document the object document is similar to, on the basis of the result of the voting process (S14). When the object document is not similar to any reference document, the similarity determination process section 14 outputs a determination signal "0" (S16) and finishes the operation. On the other hand, when the object document is similar to one of the reference documents, the similarity determination process section 14 calculates a conversion coefficient of the object document with respect to the reference document (S15), and determines whether the object document has been zoomed, on the basis of the calculated conversion coefficient (S17).

When it is determined in S17 that the object document has not been zoomed, the operation is finished. When it is determined in S17 that the object document has been zoomed, the editing process section 4 (126) carries out a conversion process for restoring the size of the object document to the size of the similar reference document on the basis of the calculated conversion coefficient, and finishes the operation.

As described above, in the image processing apparatus 101 of the present embodiment, when a document is read, it is determined whether the document is similar to a reference document. When it is determined that the document is similar to a reference document, it is further determined whether the document has been subjected to a zooming process (change of the size thereof). When it is determined that the document has been subjected to the zooming process, the size of the document is restored to the size of the similar reference document.

Consequently, even when the size of the object document has been changed from its original size, it is possible to restore the size of the object document to its original size when reusing the object document. Using this function for a document in a predetermined format such as a form document and an application document ensures higher conveniences in storing documents in the form of paper, filing documents in the form of electronic data, and reuse of data of documents.

Figure 21:
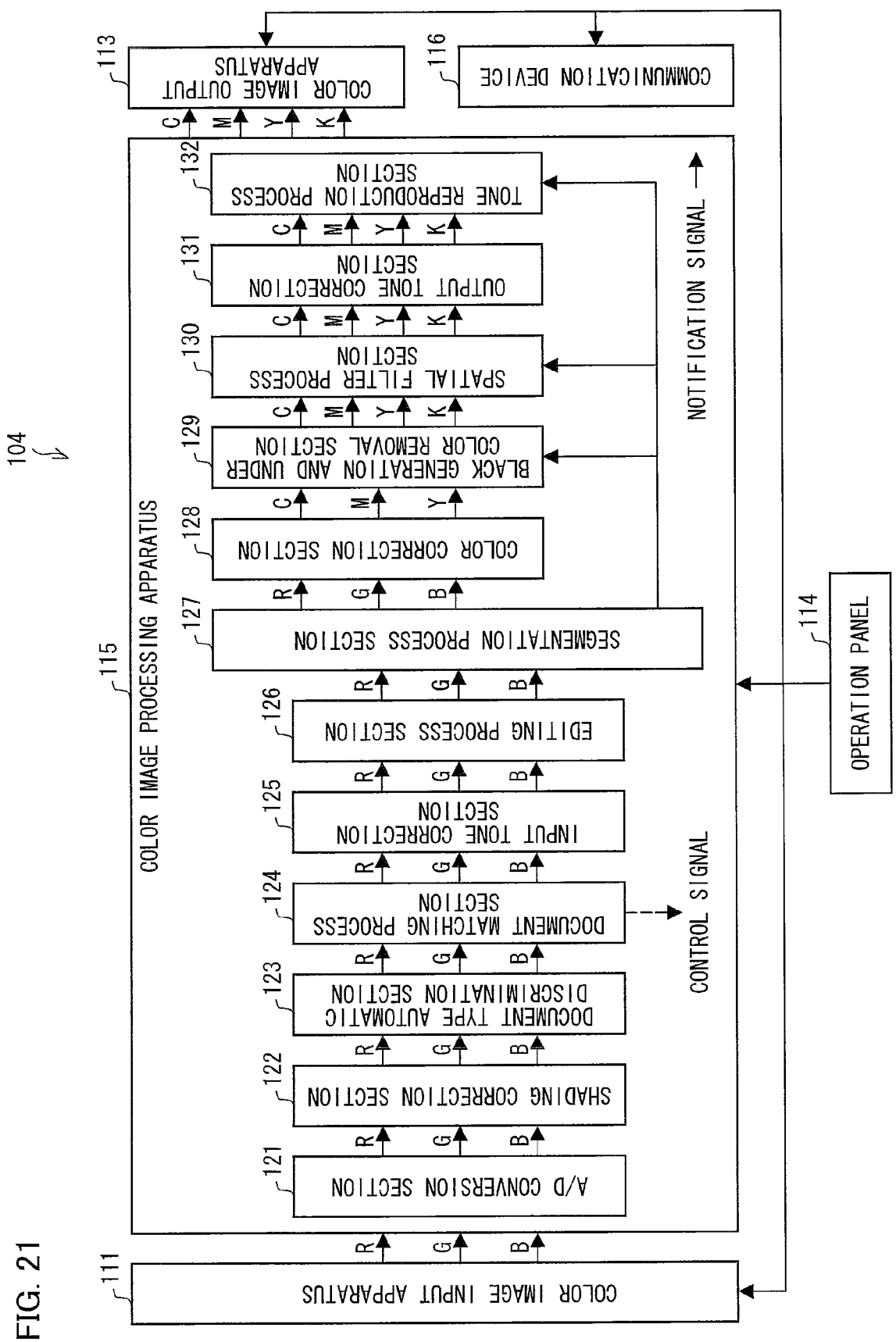
FIG. 21 is a block diagram illustrating a structure of a digital color multifunction printer including the image processing apparatus of the embodiment of the present invention.

FIG. 21 is a block diagram illustrating a structure of a digital color multifunction printer (image processing apparatus, image forming apparatus) 104. The digital color multifunction printer 104 is obtained by arranging the digital color copying machine 102 in FIG. 2 to further include a communication device 116 composed of a modem and a network card for example.

When carrying out facsimile transmission, the digital color multifunction printer 104 causes the communication device 116 to carry out a transmission procedure with a destination to secure a state where transmission can be performed, and then the digital color multifunction printer 104 reads out, from the memory 3, image data encoded in a predetermined format (image data scanned by a scanner) and carries out necessary processing such as change of the encoding format, and then sequentially transmits the image data via a communication line to the destination.

Further, when carrying out facsimile reception, the digital color multifunction printer 104 causes the communication device 5 to carry out a communication procedure and receives the image data from an originating communication device so as to input the image data to the color image processing apparatus 115. The color image processing apparatus 115 subjects the received image data to a decoding process in an encoding/decoding process section (not shown). The decoded image data is subjected to a rotation process and a resolution conversion process if necessary, and is subjected to an output tone correction (output tone correction section 131) and a tone reproduction process (tone reproduction process section 132), and is output from the color image output apparatus 113.

Further, the digital color multifunction printer 104 carries out, via a network card and a LAN cable, data communications with a computer or other digital multifunction printer connected with a network.

In the above example, an explanation was made as to a case where the present invention is applied to the digital color multifunction printer 104. However, the present invention is not limited to this case. For example, the present invention may be applied to a monochrome multifunction printer. Alternatively, the present invention may be applied to a single facsimile communication device.

Figure 22:
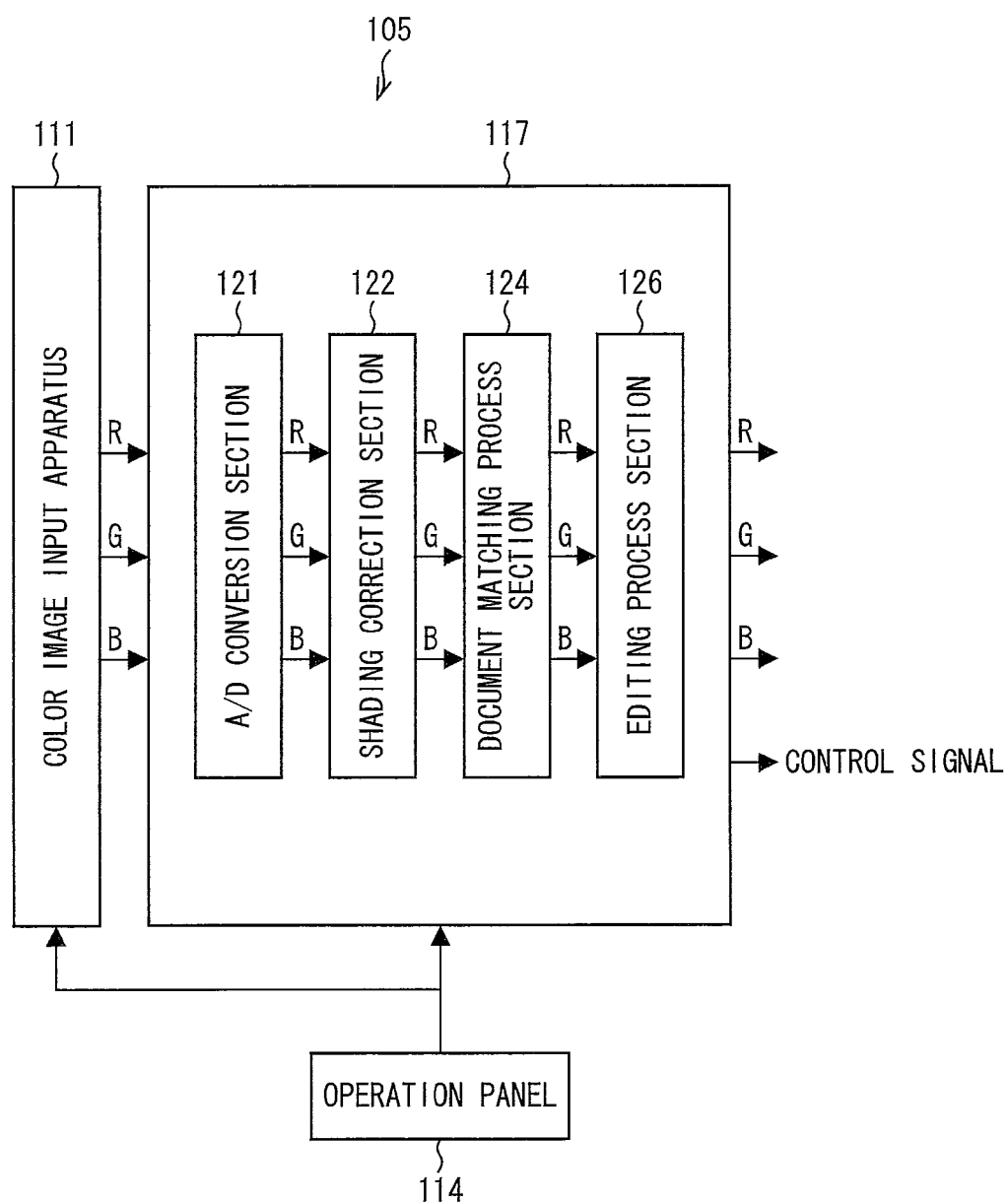
FIG. 22 is a block diagram illustrating a structure of a color image reading apparatus including the image processing apparatus of the embodiment of the present invention.

The image processing apparatus 101 of the present embodiment may be applied to an image reading apparatus. FIG. 22 is a block diagram illustrating an example of a structure of a color image reading apparatus (image processing apparatus) 105 to which the image processing apparatus 101 of the present embodiment is applied. The color image reading apparatus 105 may be a flat bed scanner or a digital camera for example.

The color image reading apparatus 105 includes a color image input apparatus 111 and a color image processing apparatus 117. The color image processing apparatus 117 includes an A/D conversion section 121, a shading correction section 122, and a document matching process section 124. The document matching process section 124 corresponds to the document matching process section 2 in FIG. 1.

The color image input apparatus 111 (image reading means) includes a scanner section including a CCD (Charge Coupled Device) for example. The color image input apparatus 111 reads an optical image reflected from a document as RGB (R: red, G: green, and B: blue) analog signals by use of the CCD, and inputs the RGB signals into the color image processing apparatus 117.

The analog signals read by the color image input apparatus 111 are transmitted in the color image processing apparatus 117 through the A/D (analog/digital) conversion section 121, the shading correction section 122, the document matching process section 124, and the editing process section 126 in this order.

The A/D conversion section 121 converts the RGB analog signals into RGB digital signals. The shading correction section 122 removes various distortions produced in an illumination system, an image focusing system, and an image sensing system of the color image input apparatus 111 from the RGB digital signals transmitted from the A/D conversion section 121. The shading correction section 122 adjusts color balance of the RGB digital signals, and converts RGB reflectance signals into density signals. The functions of the document matching process section 124 and the editing process section 126 have been described in the explanation of the document matching process section 2. After the document matching process section 124 determines that the an object document has been zoomed and calculates a conversion coefficient for the object document and the editing process section 126 subjects the object document to the conversion process, image data of the object document is transmitted via a network to a printer or a multifunction printer and is outputted. Alternatively, the image data is transmitted via a computer to a printer or directly transmitted to a printer.

Further, in a case where the color image reading apparatus 105 is used as a component of a system including at least one of a server, a computer, and a printer, the following operation is possible. For example, instead of the color image reading apparatus 105 outputting image data or synthetic image data in a common format, the color image reading apparatus 105 extracts feature points and features of read image data and outputs these information to a server, computer, and a printer. The server, the computer, and the printer extract a common format from these information.

The present invention may be obtained by causing an image processing method for performing the document matching and the output control to be stored in a computer-readable storage medium in which a program code (executable program, intermediate code program, and source program) of a program to be executed by a computer. This allows providing a totable storage medium in which a program code for the image processing method for performing the document matching, the output control, and the storage process of a document image is stored.

In the present embodiment, the storage medium may be a program medium that is a memory (not shown) itself such as a ROM since the process is performed in a microcomputer. Further, the storage medium may be a program medium from which information can be read by inserting a recording medium into a program reading device that is an external storage device.

In either case, a stored program may be executed by access of a microprocessor. Alternatively, in either case, a program code is read out and the read out program code is downloaded to a program storage area (not shown) of a microcomputer and is executed. A program for the download is stored in a main body of the apparatus beforehand.

The program medium is a storage medium that can be separated from the main body. The storage medium is a medium that fixedly supports a program. For example, tapes such as a magnetic tape and a cassette tape, or discs such as magnetic discs (e.g. a Floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM (Erasable Programmable Read Only Memory), EEPROM (Electrically Erasable Programmable Read Only Memory), and flash ROM.

The present embodiment has a system configuration to which a communication network such as the Internet is connectable, and therefore the program medium may be a medium that fluidly supports a program so that a program code is downloaded from the communication network. In a case where a program code is downloaded from the communication network, a program for the download may be stored in a main body of the apparatus beforehand or the program may be installed from other storage medium. Note that the present invention can be also realized by the program codes in the form of a computer data signal embedded in a carrier wave, which is the program that is electrically transmitted.

When the storage medium is read by a program reading device included in a digital color image forming apparatus or a computer system, the image processing method is carried out.

Further, the computer system includes: an image input apparatus such as a flat bed scanner, a film scanner, and a digital camera; a computer that is loaded with a predetermined program to execute various processes such as the image processing method; an image display apparatus for displaying the result of a process by the computer, such as a CRT display and a liquid crystal display; and a printer for outputting the result of the process by the computer onto paper etc. Further, the computer system includes a network card, modem, etc. that is communication means for connecting with a server etc. via the network.

As described above, the image processing apparatus of the present invention is an image processing apparatus that includes a similarity determination process section for comparing features of an image that are extracted from image data of a document to be matched and features of an image of a reference document that has been stored, so as to determine whether the image of the document to be matched is similar to the image of the reference document, the image processing apparatus including a conversion coefficient calculation section for determining whether the document to be matched that is determined by the similarity determination process section as being similar to the reference document has been zoomed with respect to the similar reference document, and when the document to be matched has been zoomed, the conversion coefficient calculation section calculating a conversion coefficient with which the size of the document to be matched is changed to the size of the similar reference document.

With the arrangement, the conversion coefficient calculation section determines whether the document to be matched that is determined by the similarity determination process section as being similar to the reference document has been zoomed with respect to the similar reference document, and when the document to be matched has been zoomed, the conversion coefficient calculation section calculates a conversion coefficient with which the size of the document to be matched is changed to the size of the similar reference document.

Consequently, if the size of the document to be matched has been changed from its original size, it is possible to restore the size of the document to be matched to its original size by converting the image data of the document to be matched by use of the calculated conversion coefficient.

Consequently, even if the size of documents that should be stored with their size uniformed, such as form documents and application documents, are changed and varied, matching the documents by the image processing apparatus allows uniforming the size of the documents. This makes it more convenient to store the documents in the form of paper or in the digitized form or to reuse stored data of the documents.

Image data of a document that is inputted in the image processing apparatus is, for example, image data obtained by reading a document by use of a scanner, or electronic data obtained by inputting necessary information in a format of electronic data by use of a computer (software). That is, the image data is, for example, a digitized image printed or described on paper, or data directly made as electronic data (electronic application document etc.).

It is preferable to arrange the image processing apparatus of the present invention to further include a conversion process section for converting the image data of the document to be matched, by use of the conversion coefficient calculated by the conversion coefficient calculation section, so that the size of the document to be matched gets equal to the size of the similar reference document.

With the arrangement, the conversion process section converts the size of the document to be matched to its original size. Consequently, image data of the document to be matched that is outputted from the image processing apparatus has its original size.

The image processing apparatus of the present invention may be arranged so as to further include an information addition process section for adding as associated information the conversion coefficient calculated by the conversion coefficient calculation section to the image data of the document to be matched, so that the size of the document to be matched is changed to the size of the similar reference document.

With the arrangement, the information addition process section adds the calculated conversion coefficient to the image data of the document to be matched. Consequently, although image data of the document to be matched that is outputted from the image processing apparatus has zoomed size, it is possible to restore the zoomed size to its original size by use of the added conversion coefficient.

The image processing apparatus of the present invention may be arranged so as to further include: a conversion process section for converting the image data of the document to be matched, by use of the conversion coefficient calculated by the conversion coefficient calculation section; and an information addition process section for adding as associated information the conversion coefficient calculated by the conversion coefficient calculation section to the image data of the document to be matched, the conversion by the conversion process section and the addition by the information addition process section being selectable.

With the arrangement, the conversion by the conversion process section and the addition by the information addition process section can be selected. This allows more freely restoring the size of the document to its original size, which is more convenient for a user.

The image processing apparatus of the present invention may be arranged so that the features are calculated based on a plurality of feature points extracted from an image and with respect to each feature point, and the similarity determination process section determines whether a document to be matched has been zoomed with respect to a reference document having same features as those of the document to be matched, and calculates a conversion coefficient of the document to be matched, the determination and the calculation being performed based on a positional relationship between features of the document to be matched and features of the reference document having the same features as those of the document to be matched, so that the similarity determination process section also serves as the conversion coefficient calculation section.

With the arrangement, the similarity determination process section determines whether a document to be matched has been zoomed with respect to a reference document having same features as those of the document to be matched, and calculates a conversion coefficient of the document to be matched, the determination and the calculation being performed based on a positional relationship between features of the document to be matched and features of the reference document having the same features as those of the document to be matched.

The conversion coefficient calculation section may detect the size of a document to be matched or let a user to input the size when reading an image of the document to be matched, and compare the size of the document to be matched with the size of a reference document. However, in such a case, the size of the document is limited to a predetermined size such as A4 and B5.

In contrast thereto, with the arrangement, the conversion coefficient is calculated based on a positional relationship between features of the document to be matched and features of the reference document having the same features as those of the document to be matched. Consequently, even if the document to be matched is zoomed with an unpredetermined magnification to have an unpredetermined size, it is possible to calculate the conversion coefficient.

As described above, the image processing method of the present invention is an image processing method that includes the step (i) of comparing features of an image that are extracted from image data of a document to be matched and features of an image of a reference document that has been stored, so as to determine whether the image of the document to be matched is similar to the image of the reference document, the image processing method including the step (ii) of determining whether the document to be matched that is determined in the step (i) as being similar to the reference document has been zoomed with respect to the similar reference document, and when the document to be matched has been zoomed, calculating a conversion coefficient with which the size of the document to be matched is changed to the size of the similar reference document.

As already described in the explanation of the image processing apparatus, with the arrangement, it is determined in the step (ii) whether the document to be matched that is determined in the step (i) as being similar to the reference document has been zoomed with respect to the similar reference document, and when the document to be matched has been zoomed, a conversion coefficient with which the size of the document to be matched is changed to the size of the similar reference document is calculated. Consequently, it is possible to restore the size of the document to be matched to it original size by converting image data of the document to be matched by use of the calculated conversion coefficient.

Consequently, even if the size of documents that should be stored with their size uniformed, such as form documents and application documents, are changed and varied, matching the documents by the image processing apparatus allows uniforming the size of the documents. This makes it more convenient to store the documents in the form of paper or in the digitized form or to reuse stored data of the documents.

The image processing method of the present invention may be arranged so as to further include the step (iii) of converting the image data of the document to be matched, by use of the conversion coefficient calculated in the step (ii), so that the size of the document to be matched gets equal to the size of the similar reference document.

As already described in the explanation of the image processing apparatus, with the arrangement, the size of the document to be matched is changed in the step (iii) to its original size by use of the calculated conversion coefficient, and image data of the document to be matched that has been subjected to image processing is changed to its original size.

The image processing method of the present invention may be arranged so as to further include the step (iv) of adding as associated information the conversion coefficient calculated in the step (ii) to the image data of the document to be matched, so that the size of the document to be matched is changed to the size of the similar reference document.

As already described in the explanation of the image processing apparatus, with the arrangement, the calculated conversion coefficient is added in the step (iv) to the image data of the document to be matched. Consequently, although image data of the document to be matched that is outputted from the image processing apparatus has zoomed size, it is possible to restore the zoomed size to its original size by use of the added conversion coefficient.

As described above, the image processing apparatus of the present invention includes the image processing apparatus of the present invention and an image output apparatus capable of printing and outputting image data.

As already described in the explanation of the image processing apparatus, with the arrangement, even if the size of documents that should be stored with their size uniformed, such as form documents and application documents, are changed and varied, matching the documents by the image processing apparatus allows uniforming the size of the documents. This makes it more convenient to store the documents in the form of paper or in the digitized form or to reuse stored data of the documents.

The image processing apparatus may be realized by a computer. In this case, the present invention encompasses a computer-readable storage medium in which a program for causing a computer to function as each section of the image processing apparatus to realize the image processing apparatus is stored.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. An image processing apparatus that includes a similarity determination process section for comparing features of an image that are extracted from image data of a document to be matched and features of an image of a reference document that has been stored, so as to determine whether the image of the document to be matched is similar to the image of the reference document, the image processing apparatus comprising a conversion coefficient calculation section for determining whether the document to be matched that is determined by the similarity determination process section as being similar to the reference document has been zoomed with respect to the similar reference document, and when the document to be matched has been zoomed, the conversion coefficient calculation section calculating a conversion coefficient with which the size of the document to be matched is changed to the size of the similar reference document.

2. The image processing apparatus as set forth in claim 1, further comprising a conversion process section for converting the image data of the document to be matched, by use of the conversion coefficient calculated by the conversion coefficient calculation section, so that the size of the document to be matched gets equal to the size of the similar reference document.

3. The image processing apparatus as set forth in claim 1, further comprising an information addition process section for adding as associated information the conversion coefficient calculated by the conversion coefficient calculation section to the image data of the document to be matched, so that the size of the document to be matched is changed to the size of the similar reference document.

4. The image processing apparatus as set forth in claim 1, further comprising:

a conversion process section for converting the image data of the document to be matched, by use of the conversion coefficient calculated by the conversion coefficient calculation section; and an information addition process section for adding as associated information the conversion coefficient calculated by the conversion coefficient calculation section to the image data of the document to be matched, the conversion by the conversion process section and the addition by the information addition process section being selectable.

5. The image processing apparatus as set forth in claim 1, wherein the features are calculated based on a plurality of feature points extracted from an image and with respect to each feature point, and the similarity determination process section determines whether a document to be matched has been zoomed with respect to a reference document having same features as those of the document to be matched, and calculates a conversion coefficient of the document to be matched, the determination and the calculation being performed based on a positional relationship between features of the document to be matched and features of the reference document having the same features as those of the document to be matched, so that the similarity determination process section also serves as the conversion coefficient calculation section.

6. An image processing method that includes the step (i) of comparing features of an image that are extracted from image data of a document to be matched and features of an image of a reference document that has been stored, so as to determine whether the image of the document to be matched is similar to the image of the reference document, the image processing method comprising the step (ii) of determining whether the document to be matched that is determined in the step (i) as being similar to the reference document has been zoomed with respect to the similar reference document, and when the document to be matched has been zoomed, calculating a conversion coefficient with which the size of the document to be matched is changed to the size of the similar reference document.

7. The image processing method as set forth in claim 6, further comprising the step (iii) of converting the image data of the document to be matched, by use of the conversion coefficient calculated in the step (ii), so that the size of the document to be matched gets equal to the size of the similar reference document.

8. The image processing method as set forth in claim 6, further comprising the step (iv) of adding as associated information the conversion coefficient calculated in the step (ii) to the image data of the document to be matched, so that the size of the document to be matched is changed to the size of the similar reference document.

9. An image forming apparatus, comprising:

an image processing apparatus that includes a similarity determination process section for comparing features of an image that are extracted from image data of a document to be matched and features of an image of a reference document that has been stored, so as to determine whether the image of the document to be matched is similar to the image of the reference document, the image processing apparatus including a conversion coefficient calculation section for determining whether the document to be matched that is determined by the similarity determination process section as being similar to the reference document has been zoomed with respect to the similar reference document, and when the document to be matched has been zoomed, the conversion coefficient calculation section calculating a conversion coefficient with which the size of the document to be matched is changed to the size of the similar reference document; and an image output apparatus capable of printing and outputting image data.

10. A computer-readable storage medium in which a program is stored, the program causing a computer to function as each section of an image processing apparatus that includes a similarity determination process section for comparing features of an image that are extracted from image data of a document to be matched and features of an image of a reference document that has been stored, so as to determine whether the image of the document to be matched is similar to the image of the reference document, the image processing apparatus including a conversion coefficient calculation section for determining whether the document to be matched that is determined by the similarity determination process section as being similar to the reference document has been zoomed with respect to the similar reference document, and when the document to be matched has been zoomed, the conversion coefficient calculation section calculating a conversion coefficient with which the size of the document to be matched is changed to the size of the similar reference document.

* * * * *